United States Patent
Rongley

(10) Patent No.: US 11,790,315 B2
(45) Date of Patent: Oct. 17, 2023

(54) SYSTEMS, METHODS, COMPUTING PLATFORMS, AND STORAGE MEDIA FOR DIRECTING AND CONTROLLING AN AUTONOMOUS INVENTORY MANAGEMENT SYSTEM

(71) Applicant: Autonomous Shelf, Inc., Denver, CO (US)

(72) Inventor: Eric Rongley, Golden, CO (US)

(73) Assignee: Autonomous Shelf, Inc., Denver, CO (US)

( * ) Notice: Subject to any disclaimer, the term of this patent is extended or adjusted under 35 U.S.C. 154(b) by 417 days.

(21) Appl. No.: 16/867,707

(22) Filed: May 6, 2020

(65) Prior Publication Data
US 2020/0364652 A1  Nov. 19, 2020

Related U.S. Application Data

(60) Provisional application No. 62/844,243, filed on May 7, 2019, provisional application No. 62/844,248, filed on May 7, 2019.

(51) Int. Cl.
*G06Q 10/08* (2023.01)
*G06Q 50/30* (2012.01)
(Continued)

(52) U.S. Cl.
CPC ........... *G06Q 10/087* (2013.01); *B65D 88/74* (2013.01); *G01C 21/3415* (2013.01);
(Continued)

(58) Field of Classification Search
CPC ............. G06Q 30/0185; G06Q 10/087; G06Q 10/047; G06Q 10/0832; G06Q 10/0833;
(Continued)

(56) References Cited

U.S. PATENT DOCUMENTS

| 6,748,292 B2 | 6/2004 | Mountz |
| 6,950,722 B2 | 9/2005 | Mountz |

(Continued)

FOREIGN PATENT DOCUMENTS

| CA | 2936393 A1 | 1/2017 |
| CN | 2726446 Y | 9/2005 |

(Continued)

OTHER PUBLICATIONS

Shead, Sam, "Amazon now has 45,000 robots in its warehouses", Business Insider, Jan. 3, 2017, https://www.businessinsider.com/amazons-robot-army-has-grown-by-50-2017-1 (Year: 2017).*

(Continued)

*Primary Examiner* — Resha Desai
*Assistant Examiner* — Michelle E Carey
(74) *Attorney, Agent, or Firm* — Neugeboren O'Dowd PC

(57) ABSTRACT

Systems, methods, computing platforms, and storage media for directing and controlling an autonomous inventory management system are disclosed. Exemplary implementations may place an inventory item in an autonomous storage unit, direct the autonomous storage unit to depart a starting location, direct the autonomous storage unit to board a first transport system departing for a first arrival location, determine whether an event will delay or expedite the arrival of the autonomous storage unit at the first arrival location, determine alternative routing options for the autonomous storage unit to continue travel to the first arrival location, recalculate the route of the autonomous storage unit to the first arrival location, and select a new route to the first arrival location.

13 Claims, 9 Drawing Sheets

(51) Int. Cl.
*G01C 21/34* (2006.01)
*G05D 1/00* (2006.01)
*G06Q 10/087* (2023.01)
*H04L 9/32* (2006.01)
*G06Q 10/0832* (2023.01)
*G06Q 10/0833* (2023.01)
*B65D 88/74* (2006.01)
*G06K 7/10* (2006.01)
*G06Q 10/047* (2023.01)
*G06Q 30/018* (2023.01)

(52) U.S. Cl.
CPC ....... *G05D 1/0088* (2013.01); *G06K 7/10366* (2013.01); *G06Q 10/047* (2013.01); *G06Q 10/0832* (2013.01); *G06Q 10/0833* (2013.01); *G06Q 50/30* (2013.01); *H04L 9/3213* (2013.01); *G01C 21/3423* (2013.01); *G05D 2201/0213* (2013.01); *G06Q 30/0185* (2013.01)

(58) Field of Classification Search
CPC ........... G06Q 50/30; G05D 2201/0213; G05D 1/0088; H04L 9/3213; G06K 7/10366; G01C 21/3423; G01C 21/3415; B65D 88/74
See application file for complete search history.

(56) References Cited

U.S. PATENT DOCUMENTS

| | | | |
|---|---|---|---|
| 7,243,001 B2 | 7/2007 | Janert et al. | |
| 7,402,018 B2 | 7/2008 | Mountz et al. | |
| 7,850,413 B2 | 12/2010 | Fontana | |
| 7,881,820 B2 | 2/2011 | Antony et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,086,344 B1 | 12/2011 | Mishra et al. | |
| 8,103,377 B1 | 1/2012 | Wong et al. | |
| 8,220,710 B2 | 7/2012 | Hoffman et al. | |
| 8,234,006 B1 | 7/2012 | Sachar et al. | |
| 8,239,291 B2 | 8/2012 | Hoffman et al. | |
| 8,265,873 B2 | 9/2012 | D'Andrea et al. | |
| 8,280,547 B2 | 10/2012 | D'Andrea et al. | |
| 8,306,650 B1 | 11/2012 | Antony et al. | |
| 8,326,452 B2 | 12/2012 | Somin et al. | |
| 8,433,437 B1 | 4/2013 | Shakes et al. | |
| 8,527,325 B1 | 9/2013 | Atreya et al. | |
| 8,594,834 B1 | 11/2013 | Clark et al. | |
| 8,606,392 B2 | 12/2013 | Wurman et al. | |
| 8,626,335 B2 | 1/2014 | Wurman et al. | |
| 8,639,382 B1 | 1/2014 | Clark et al. | |
| 8,718,814 B1 | 5/2014 | Clark et al. | |
| 8,798,784 B1 | 8/2014 | Clark et al. | |
| 8,798,786 B2 | 8/2014 | Wurman et al. | |
| 8,805,573 B2 | 8/2014 | Brunner et al. | |
| 8,805,574 B2 | 8/2014 | Stevens et al. | |
| 8,825,197 B1 | 9/2014 | Guan | |
| 8,831,984 B2 | 9/2014 | Hoffman et al. | |
| 8,892,240 B1 | 11/2014 | Vliet et al. | |
| 8,909,368 B2 | 12/2014 | D'Andrea et al. | |
| 8,930,133 B2 | 1/2015 | Wurman et al. | |
| 8,958,903 B1 | 2/2015 | Rotella et al. | |
| 8,965,562 B1 | 2/2015 | Wurman et al. | |
| 8,972,045 B1 | 3/2015 | Mountz et al. | |
| 9,008,827 B1 | 4/2015 | Dwarakanath et al. | |
| 9,008,829 B2 | 4/2015 | Worsley | |
| 9,656,805 B1 | 5/2017 | Evans et al. | |
| 9,764,836 B1 | 9/2017 | Elzinga et al. | |
| 9,916,562 B1 | 3/2018 | Armato | |
| 10,222,798 B1* | 3/2019 | Brady | G05D 1/0088 |
| 10,303,171 B1 | 5/2019 | Brady et al. | |
| 11,308,444 B2 | 4/2022 | Rongley | |
| 2004/0093116 A1 | 5/2004 | Mountz | |
| 2007/0080000 A1 | 4/2007 | Tobey et al. | |
| 2008/0040182 A1 | 2/2008 | Wegner et al. | |
| 2008/0167884 A1 | 7/2008 | Mountz et al. | |
| 2011/0103924 A1 | 5/2011 | Watt et al. | |
| 2011/0153063 A1 | 6/2011 | Wurman et al. | |
| 2011/0320322 A1 | 12/2011 | Roslak | |
| 2012/0066626 A1 | 3/2012 | Geleijnse | |
| 2013/0054005 A1 | 2/2013 | Stevens et al. | |
| 2013/0103552 A1 | 4/2013 | Hoffman et al. | |
| 2013/0173049 A1 | 7/2013 | Brunner et al. | |
| 2014/0046585 A1* | 2/2014 | Morris, IV | G01C 21/00 701/400 |
| 2014/0195040 A1 | 7/2014 | Wurman et al. | |
| 2014/0350831 A1 | 11/2014 | Hoffman et al. | |
| 2015/0151912 A1 | 6/2015 | Mountz et al. | |
| 2015/0151913 A1 | 6/2015 | Wong et al. | |
| 2015/0202770 A1 | 7/2015 | Patron et al. | |
| 2015/0324735 A1* | 11/2015 | Lord | G06Q 10/08 705/330 |
| 2015/0336270 A1 | 11/2015 | Storr | |
| 2015/0353280 A1 | 12/2015 | Brazeau et al. | |
| 2015/0353282 A1 | 12/2015 | Mansfield et al. | |
| 2016/0019497 A1 | 1/2016 | Carvajal | |
| 2016/0236867 A1 | 8/2016 | Brazeau et al. | |
| 2016/0257401 A1* | 9/2016 | Buchmueller | G01C 21/343 |
| 2016/0292634 A1 | 10/2016 | Mehring et al. | |
| 2017/0088360 A1 | 3/2017 | Brazeau et al. | |
| 2017/0136931 A1 | 5/2017 | Colantonio et al. | |
| 2017/0161486 A1 | 6/2017 | Jeon et al. | |
| 2017/0217683 A1 | 8/2017 | Lyon et al. | |
| 2017/0293294 A1 | 10/2017 | Atchley et al. | |
| 2018/0024554 A1 | 1/2018 | Brady et al. | |
| 2018/0032949 A1 | 2/2018 | Galluzzo et al. | |
| 2018/0058739 A1 | 3/2018 | Zou | |
| 2018/0074504 A1 | 3/2018 | Shydo, Jr. | |
| 2018/0086353 A1 | 3/2018 | Holbrooke et al. | |
| 2018/0086561 A1 | 3/2018 | Stubbs et al. | |
| 2018/0189724 A1 | 7/2018 | Mattingly | |
| 2018/0357848 A1 | 12/2018 | McLellan et al. | |
| 2019/0072979 A1 | 3/2019 | Sukhomlinov et al. | |
| 2020/0065748 A1 | 2/2020 | Durkee et al. | |
| 2020/0122927 A1 | 4/2020 | Bellar et al. | |
| 2020/0219348 A1 | 7/2020 | Hanlon | |
| 2020/0225665 A1 | 7/2020 | Rongley | |
| 2020/0364653 A1 | 11/2020 | Rongley | |
| 2021/0073716 A1 | 3/2021 | Dearing | |
| 2021/0276805 A1 | 9/2021 | Rongley | |
| 2022/0009715 A1 | 1/2022 | Rongley | |
| 2022/0012677 A1 | 1/2022 | Rongley | |

FOREIGN PATENT DOCUMENTS

| | | |
|---|---|---|
| CN | 203020893 U | 6/2013 |
| CN | 105314315 B | 12/2017 |
| CN | 206975763 U | 2/2018 |
| EP | 2136329 A2 | 12/2009 |
| EP | 1590272 B1 | 8/2010 |
| KR | 20190070700 A | 6/2019 |
| WO | 2007149194 A2 | 12/2007 |
| WO | 2007149703 A2 | 12/2007 |
| WO | 2020123445 A1 | 6/2020 |
| WO | 2020227379 A1 | 11/2020 |
| WO | 2020227381 A1 | 11/2020 |

OTHER PUBLICATIONS

Young, Lee, "International Search Report and Written Opinion Regarding International Application No. PCT/US2019/65377", dated Mar. 30, 2020, pp. 23, Published in: US.

Lee Young, "Internation Search Report and Written Opinion Regarding International Application No. PCT/US20/31631", dated Aug. 4, 2020, pp. 16, Published in: US.

"Automated Load Measuring System", Cast Engineering, ALMS, 2016, 4 pages, Online available at <https://fuelmonitoring.org>, 2016.

(56) References Cited

OTHER PUBLICATIONS

Final Office Action received for U.S. Appl. No. 16/708,618 dated Apr. 25, 2022, 82 pages.
International Preliminary Report on Patentability received for International PCT Application Serial No. PCT/US2019/065377 dated Jun. 24, 2021, 15 pages.
International Preliminary Report on Patentability received for International PCT Application Serial No. PCT/US2020/031631 dated Nov. 18, 2021, 9 pages.
International Preliminary Report on Patentability received for International PCT Application Serial No. PCT/US2020/031634 dated Nov. 18, 2021, 8 pages.
Notice of Allowance received for U.S. Appl. No. 16/867,711 dated Dec. 14, 2021, 42 pages.
Raj et al., "Analyzing Critical Success Factors for Implementation of Drones in the Logistics Sector using Grey-DEMATEL Based Approach", Computers and Industrial Engineering, vol. 138, No. 106118, 12 pages, 2019.
Response filed on Jan. 6, 2022 for Non Final Office Action of U.S. Appl. No. 16/708,618 dated Jul. 7, 2021, 25 pages.
Response filed on Oct. 1, 2021 for Non Final Office Action of U.S. Appl. No. 16/867,711 dated Apr. 1, 2021, 25 pages.
Cooley, Chase Littlejohn, "Office Action Regarding U.S. Appl. No. 16/708,618", dated Jul. 7, 2021, pp. 56, Published in: US.
Bruner, Nicole Elena, "Office Action Regarding U.S. Appl. No. 16/867,711", dated Apr. 1, 2021, pp. 49, Published in: US.
Thomas, Shane, "International Search Report and Written Opinion Regarding International Application No. PCT/US21/21482", dated Jul. 19, 2021, pp. 25, Published in: US.
Thomas, Shane, "International Search Report and Written Opion Regarding International Application No. PCT/US20/31634", dated Aug. 7, 2020, pp. 9, Published in: US.
International Preliminary Report on Patentability received for International PCT Application Serial No. PCT/US2021/021482 dated Sep. 6, 2022, 10 pages.
Non Final Office Action received for U.S. Appl. No. 17/335,541 dated Dec. 19, 2022, 47 pages.

\* cited by examiner

SYSTEMS, METHODS, COMPUTING PLATFORMS, AND STORAGE MEDIA FOR DIRECTING AND CONTROLLING AN AUTONOMOUS INVENTORY MANAGEMENT SYSTEM

CROSS-REFERENCE TO RELATED APPLICATIONS

The present application is related to U.S. Provisional Application Ser. Nos. 62/778,127 and 62/778,131, the contents of which are incorporated herein by reference in their entirety and for all proper purposes. The present application for patent also claims priority to U.S. Provisional Application Nos. 62/844,243 and 62/844,248, both filed May 7, 2019 and assigned to the assignee hereof, the contents of which are hereby expressly incorporated by reference herein.

FIELD OF THE DISCLOSURE

The present disclosure relates to systems, methods, computing platforms, and storage media for directing and controlling an autonomous inventory management system.

BACKGROUND

Supply chains are networks, much like computer networks. While deterministic computer networks are efficient in a static environment like a closed office, they are not resilient to real world events and disruptions. Transmission Control Protocols (TCP) and Internet Protocols (IP) protocols that are used to govern the connection of computer systems to the internet demonstrated that it was conceivable to reroute around failures in a loosely formed network. In some aspects, these protocols were critical in making email, the web and mobile technology possible.

Supply chains are similar in some regards. For instance, there are any number of disruptions that can take place during the delivery of supplies to their destinations. In spite of these disruptions, stores and factories need regular delivery of their products.

While automation has contributed to lower costs and higher uptimes in supply chains, the rigidity and lack of awareness of current automation systems also presents numerous problems. In some cases, the centralized nature of the logic architecture controlling the robot fleets lacks scalability and leads to increased latency. For instance, current automation hardware relies on a set of instructions received from a central processing system for transporting goods. However, technological challenges arise when an autonomous operation is required from the automation system in conjunction with additional tasks, such as when an autonomous response to inventory demands is needed along with the transportation of goods. The limited capability of current robots to adapt logistically within the same or a different geographic site, particularly in response to inventory demands, has prevented automation systems from expanding beyond their currently limited capabilities.

Logistics capability aside, current techniques for warehouse and supply chain automation systems include robots with limited intelligence and functionality. In some cases, such robots are configured to dock with specially modified shelves by driving under them, lifting them up, and transporting them from one point to another. While these robots have brought about some advances in inventory handling and transport, the shelves themselves have not evolved much. In other words, the shelves utilized in current warehouse automation systems have no added functionality beyond providing storage space for inventory. It should be noted, however, that these robots are in no way "intelligent", since they are not only unaware of the inventory they are carrying and transporting (e.g., inventory levels of different items), but also any goals or targets pertaining to that inventory (e.g., varying priorities for different inventory requests/demands, sensitivity of inventory to vibrations, temperature, light, etc.).

Thus, there is a need for improved techniques for directing and controlling inventory storage units and robots in an autonomous inventory management system.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. It should be noted that the terms autonomous storage unit, autonomous inventory storage unit, inventory storage robot, autonomous inventory robot, or mobile inventory transportation unit (MITU) may be used interchangeably throughout this application and may be applied to similar systems outside of the warehouse and supply chain industry. Further, the terms inventory storage device, storage device, shelf, or storage container may be used interchangeably throughout this application.

In order to address the deficiencies in the current technology, disclosed herein is a system and a method for directing and controlling an autonomous inventory management system. The present disclosure is generally directed to providing autonomous control to an inventory storage robot which may enable it to track, in real-time, its progress across one or more legs of its journey until it reaches its destination. In some embodiments, the inventory storage robot may also provide timely status updates to one or more of the suppliers' and receivers' control systems. Such timely status updates may include an indication of a late arrival, an early arrival, deviation of a climate-controlled unit's temperature from pre-set control conditions, excessive vibrations, etc. Furthermore, the inventory storage robot of the present disclosure may comprise decision making capabilities, allowing it to override and reroute its original route. The inventory storage robot may also be aware and knowledgeable about its currently held inventory, including product names and quantities, climate control requirements, delivery deadlines, etc. In some circumstances, the inventory storage robot may also be configured to consider one or more relevant business rules while determining an alternate route, for instance, due to a delay in one or more legs of its originally planned journey. Such business rules may include time (i.e., find fastest path) and cost (i.e., find cheapest path), although, other business rules may be considered in different embodiments. In yet other cases, the inventory storage robot may select an alternative route or path based on other parameters, such as a current power level of the robot and its ability to recharge along its route.

One aspect of the present disclosure relates to a system configured for directing and controlling an autonomous inventory management system. The system may include an autonomous storage unit, the autonomous storage unit comprising a housing and a power device that is operationally configured to supply power to the electrical components of the autonomous storage unit. The power device may be selected from a group consisting of a battery cell, a fuel cell, or a solar cell source. In some embodiments, the autonomous storage unit can include an inventory storage device that is physically coupled to the housing. In some embodiments, the inventory storage device may be in electrical communication with the power device, and may comprise at least one visual indicator and one or more shelves, buckets, augers, arms, and climate controlled units to hold inventory, wherein the inventory storage device is operationally configured to control the at least one visual indicator, and analyze information pertaining to the held inventory based in part on a received inventory demand. For instance, Radio Frequency Identification (RFID tags) may be affixed or attached to inventory items, while the autonomous storage unit may comprise a RFID reader. In such cases, the MITU may utilize the RFID reader to scan and identify inventory items that are being added or removed from the inventory storage device. Additionally, or alternatively, the MITU or the shelves of the inventory storage device may also comprise built-in weighing scales for detecting the weight of inventory items being added to or removed from the shelves. In some circumstances, each shelf of the inventory storage device may comprise a built-in weigh scale. Further, by determining the weight of an inventory item that is added or removed from the shelf, and comparing it to one or more of a database comprising weights of various inventory items or an inbound order that was scheduled to be loaded on to the autonomous storage unit, the autonomous storage unit or the inventory storage device may be able to determine items that are being added to or removed from the shelf. In some other cases, the autonomous storage unit or the inventory storage device may be aware of its current inventory, including weights, quantities, locations on shelves, etc. In such cases, the autonomous storage unit may be able to determine items that are being added to or removed from its shelves by comparing and analyzing the weight of the currently held inventory to the previously held inventory. In some embodiments, the autonomous storage unit can include a drive device that is in electrical communication with the power device and is operationally configured to physically move the autonomous storage unit from a first point to a second point. In some embodiments, the autonomous storage unit can include a navigation device that is in electrical communication with the power device and is operationally configured to transmit and receive geographic data and determine the physical location of the autonomous storage unit. In further embodiments, the method of transmitting and receiving data of the navigation device may be based at least in part on a GPS, Wi-Fi, or Cellular transmission. Additionally, or alternatively, the method of transmitting or receiving may be beacon based, for instance, to account for indoor use and localization functions based on technologies other than Wi-Fi.

In some embodiments, the autonomous storage unit can include a sensing device that is in electrical communication with the power device and is operationally configured to detect physical objects and transmit and receive physical object data. In further embodiments, the method of detection of physical objects of the sensing may be Light Detection and Ranging (LIDAR), Radar, Laser, ultrasonic, visual or Infrared sensing. In some embodiments, the autonomous storage unit can include a control device that is in electrical communication with the power device, the drive device, the navigation device, and the sensing device, and is operationally configured to control the autonomous storage unit and transmit and receive data from physically separate systems, including at least receiving the inventory demand, and wherein the physically separate systems comprises a transportation system, a central system, or another autonomous storage unit. In further embodiments, the method of transmitting and receiving data of the control device may be Wi-Fi, cellular, near field communication, Bluetooth, or a combination thereof.

The system may further include one or more hardware processors configured by machine-readable instructions. The processor(s) may be configured to place an inventory item in an autonomous storage unit. The processor(s) may be configured to direct the autonomous storage unit to depart a starting location. The processor(s) may be configured to direct the autonomous storage unit to board a first transport system departing for a first arrival location. The processor(s) may be configured to determine whether an event will delay or expedite the arrival of the autonomous storage unit at the first arrival location. The processor(s) may be configured to determine alternative routing options for the autonomous storage unit to continue travel to the first location. The processor(s) may be configured to recalculate the route of the autonomous storage unit to the first arrival location. The processor(s) may be configured to select a new route to the first arrival location.

Another aspect of the present disclosure relates to a method for directing and controlling an autonomous inventory management system. The method may include placing an inventory item in an autonomous storage unit. The method may include directing the autonomous storage unit to depart a starting location. The method may include directing the autonomous storage unit to board a first transportation system departing for a first arrival location. The method may include determining whether an event will delay or expedite the arrival of the autonomous storage unit at the first arrival location. The method may include determining alternative routing options for the autonomous storage unit to continue travel to the first location. The method may include recalculating the route of the autonomous storage unit to the first arrival location. The method may include selecting a new route to the first arrival location.

Yet another aspect of the present disclosure relates to a computing platform configured for directing and controlling an autonomous inventory management system. The computing platform may include a non-transient computer-readable storage medium having executable instructions embodied thereon. The computing platform may include one or more hardware processors configured to execute the instructions. The processor(s) may execute the instructions to place an inventory item in an autonomous storage unit. The processor(s) may execute the instructions to direct the autonomous storage unit to depart a starting location. The processor(s) may execute the instructions to direct the autonomous storage unit to board a first transportation system departing for a first arrival location. The processor(s) may execute the instructions to determine whether an event will delay or expedite the arrival of the autonomous storage unit at the first arrival location, as well as determine alternative routing options for the autonomous storage unit to continue travel to the first location. The processor(s) may also execute the instructions to recalculate the route of the autonomous storage unit to the first arrival location and select a new route to the first arrival location.

Still another aspect of the present disclosure relates to a system configured for directing and controlling an autonomous inventory management system. The system may include means for placing an inventory item in an autonomous storage unit. The system may include means for directing the autonomous storage unit to depart a starting location. The system may include means for directing the autonomous storage unit to board a first transportation system departing for a first arrival location. The system may include means for determining whether an event will delay or expedite the arrival of the autonomous storage unit at the first arrival location. In some cases, the system may include means for determining alternative routing options for the autonomous storage unit to continue travel to the first location. The system may also include means for recalculating the route of the autonomous storage unit to the first arrival location and means for selecting a new route to the first arrival location.

Even another aspect of the present disclosure relates to a non-transient computer-readable storage medium having instructions embodied thereon, the instructions being executable by one or more processors to perform a method for directing and controlling an autonomous inventory management system. The method may include placing an inventory item in an autonomous storage unit, directing the autonomous storage unit to depart a starting location, directing the autonomous storage unit to board a first transportation system departing for a first arrival location, and determining whether an event will delay or expedite the arrival of the autonomous storage unit at the first arrival location. In some embodiments, the method may include determining alternative routing options for the autonomous storage unit to continue travel to the first location, recalculating the route of the autonomous storage unit to the first arrival location, and selecting a new route to the first arrival location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
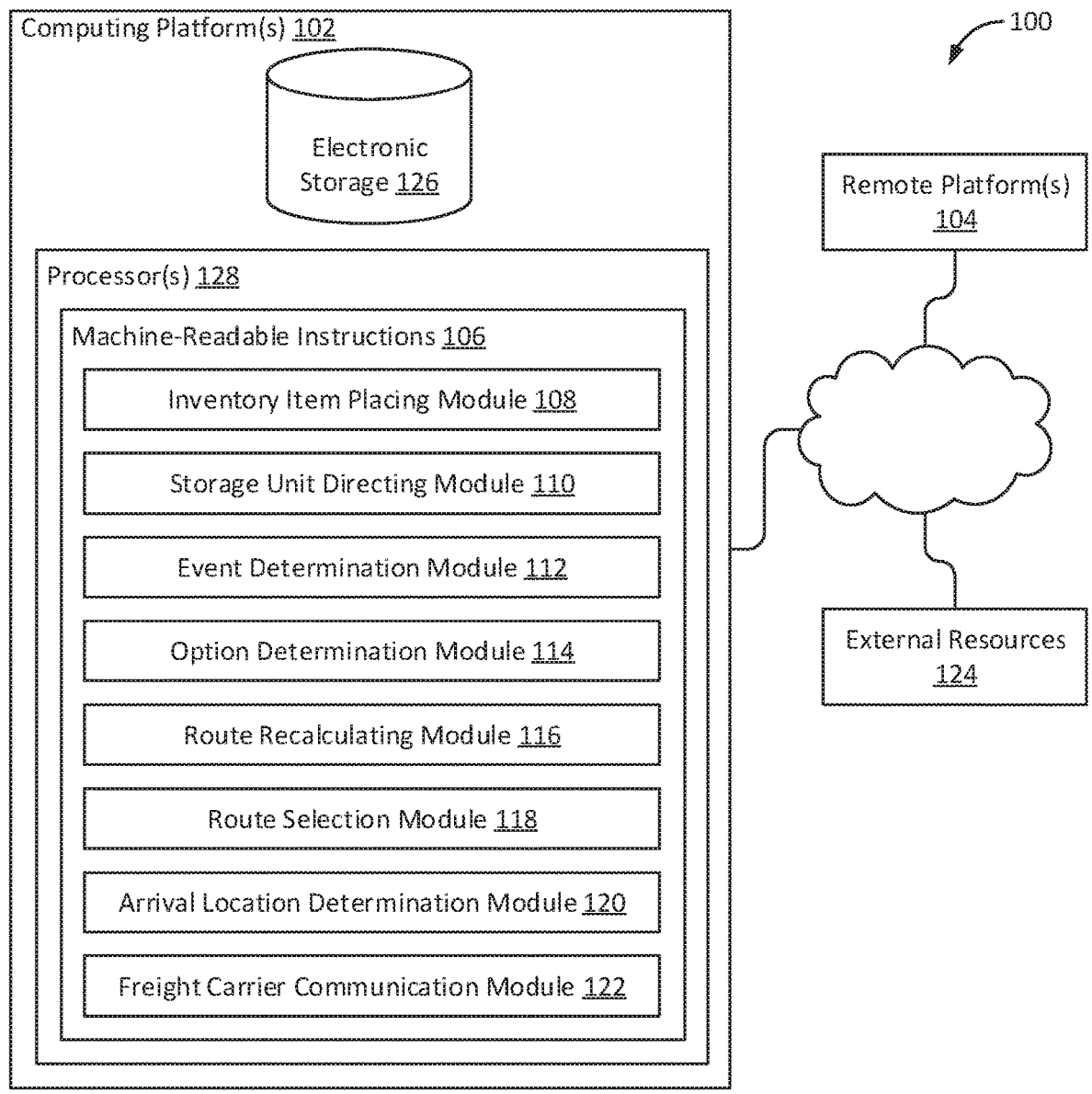
FIG. 1 illustrates a system configured for directing and controlling an autonomous inventory management system, in accordance with one or more implementations.

The words "for example" is used herein to mean "serving as an example, instance, or illustration." Any embodiment described herein as "for example" is not necessarily to be construed as preferred or advantageous over other embodiments.

In some cases, autonomous inventory may be wrapped in a "smart package", much like emails or web traffic wrapped in Transmission Control Protocol (TCP)/Internet Protocol (IP) packets, which facilitates the delivery of emails to their respective destinations across the internet. In other words, like a fire and forget missile, an autonomous inventory robot may be launched from a source destination (e.g., warehouse), upon which control may be passed over to the autonomous inventory robot, enabling it to make its own way across various supply chain networks to reach its ultimate destination.

In some aspects, the autonomous inventory robot may thus become the packet around the inventory. In some embodiments, the autonomous inventory robot may comprise computing power, allowing it to perform functions besides just physically holding the inventory. For instance, the autonomous inventory robot may be aware of the inventory items it is carrying, as well as a drop off location for each of those inventory items. In some other cases, the autonomous inventory robot may be configured to make rerouting or planning decisions based on one or more relevant business rules, such as finding the fastest path or cheapest path to its destination.

Current techniques in autonomous inventory transport systems include complex and centrally managed transportation management systems. Such transportation management systems are configured to individually and methodically control multiple inventory storage units in parallel. Besides the complex nature of implementing such systems, these systems lack the ability to dynamically respond to environmental changes with minimal latency. As an example, in current systems, if a package is being sent from a factory in Los Angeles (LA) to another factory or retail location in Memphis, a complex and centrally managed Transportation Management System may determine the method and route for an inventory unit carrying the package from LA to reach its final destination in Memphis. The route selected by the Transportation Management System may comprise one or more transit points or waypoints, for instance, to save on transport costs. In some cases, at each waypoint along the way, humans or machines may scan the package, connect it into the preset route, and then direct it towards its next preset leg of its journey. In this example, the Transportation Management System may have selected for the package to be transported from LA to Memphis via Denver. This transport may involve a mix of road transportation and/or freight transportation (i.e., flight, rail, waterways, etc.). If, for example, the inventory storage unit gets delayed in making its continuing connection from Denver to Memphis due to a snow storm, it may be stuck in Denver until the next connection. In such cases, an external system may have to recognize that the package missed its connection and determine how to handle the delivery of the package. In some cases, the package may be scheduled to arrive late at its destination, which may be outside a time window promised to the receiving entity. In such cases, the factory in LA (i.e., the supplier) may need to send a backup package via express couriers to the receiving entity in Memphis. Regardless of the decision made, the package or inventory storage unit plays no active role in solving the problem, and instead, relies on external actors and systems (i.e., central Transportation Management System) to first recognize the problem and then take corrective action. This puts a massive burden on the transportation management system, for instance, if it is responsible for managing multiple packages or deliveries. Besides the technological complexities associated with implementing such systems, these systems also suffer from latency issues.

The Applicant's disclosure aims to alleviate some of these shortcomings of the current inventory transportation management systems by supporting real-time updates from autonomous inventory storage units, as well as dynamic decision-making capabilities at autonomous storage units. In some circumstances, such autonomous storage units may utilize wireless and/or Near Field Communication (NFC) technologies, such as Wi-Fi, Bluetooth, Bluetooth Low Energy (BLE), NFC, etc., to connect with various couriers and freight companies to plan their path from a source to a final destination.

Returning to the above example, according to the present disclosure, the autonomous inventory storage unit carrying the package may continuously monitor its progress across the multiple legs of its journey until it reaches its destination. In some examples, the autonomous inventory storage unit may also provide real time updates about its progress to one or more of the suppliers' and receivers' central systems. In addition to wireless and NFC communication technologies, the inventory storage unit may also comprise navigation technologies, such as a Global Positioning System (GPS) chip.

In some circumstances, the autonomous inventory storage unit may realize through one or more of GPS, waypoint arrival and departure times, weather conditions, or other current events, that it may not be able to follow its originally conceived route for a timely arrival at its destination. In some cases, the autonomous inventory storage unit may determine that an alternative route which is optimized for one or more of cost and time (e.g., reduced risk of delay or other issues along the route) is available. In one example, an alternative route may have a reduced risk of delay due to a change in weather conditions, and may become more optimal than the current route. In such cases, the autonomous inventory storage unit may then preemptively switch to the optimized alternative route before any delay is observed. In some cases, an autonomous inventory storage unit may switch its route by connecting to minute courier routing tables, via wireless networks, to reroute itself to its destination. In this example, rather than taking the originally scheduled truck route from Denver to Chicago before flying to Memphis, the autonomous storage unit may determine that a more efficient route to Memphis from Denver might involve passing through Dallas (e.g., a flight or truck from Denver to Dallas).

In some embodiments, the autonomous inventory storage unit may deploy rules-based strategies for planning its routes. For instance, the rule-based strategies may comprise prioritizing time, cost, etc. In some cases, if time is of the essence, the autonomous storage unit may be configured to choose faster or more reliable methods of transport like trains or airplanes for one or more legs of its journey, so as to arrive as soon as possible at its destination. In other cases, if cost is of the essence, the autonomous storage unit may be configured to choose cheaper methods of transport like a combination of flights and road transport (e.g., trucks) to arrive at its destination.

In some cases, the autonomous inventory unit may be configured to provide updates pertaining to an early or a late arrival to its host controller (e.g., warehouse control system). In some cases, the host controller may then change the inventory's mission in conjunction with one or more inputs received from the autonomous inventory unit. For instance, rather than continuing on to Memphis and arriving late, the host controller or sender may redirect the autonomous storage unit to another customer in Dallas, while arranging for another package to be sent from LA to Memphis via expedited means, such as air express. In some other cases, instead of receiving an alternative route from the host controller, the autonomous inventory storage unit may calculate its own route to Dallas.

In current systems, such delays or unforeseen circumstances, may cause two identical packages to land up in Memphis, or a first package to arrive in Memphis and a second package to be rerouted back to LA. In either case, two packages of inventory may be shipped out to address demands of a single customer. However, according to the present disclosure, demands of two customers may be met, despite delays in the supply chain. That is, the present disclosure may serve to optimize efficiency, resiliency, and/or latency in current supply chains.

In some embodiments, the autonomous inventory robot may be configured to diagnose mechanical or electrical issues and notify the same to the central system or a host controller. In some instances, the autonomous inventory robot may also receive, appropriate solutions, if any, for addressing the issues. In other cases, such as when it is not feasible to address the issues in a timely manner, the autonomous inventory robot may be redirected to a warehouse or service depot in its vicinity for repair. In some cases, the autonomous inventory robot may transfer its inventory along with instructions for completing the mission to another robot at the warehouse or the service depot.

In some embodiments, the inventory storage robot may be configured to make autonomous decisions, which may be limited by scopes or constraints provided by the central system. Some examples of constraints or scopes may include cost, time, number of waypoints, etc. Thus, in some aspects, the autonomous inventory storage robot may have a time and/or cost budget (e.g., $100, $1000, etc.) to complete its mission. The robot may also include capabilities for making payments, such as credit card payments, NFC payments, wire transfers, etc., via wireless, Bluetooth, or NFC communication systems. In some embodiments, the inventory storage robot may deploy such payment techniques while scheduling an alternate route on other couriers, for instance, in the case of a disruption to its originally planned route.

Freelancing and gig-economy work is ubiquitous in today's transportation networks, especially for personal transport. It is contemplated that freelancers may also play a more active role for transporting cargo and goods in the freight industry. As an example, freelancers may be able to auction off unutilized space in their vehicles, which may be a win-win for all parties involved. Returning to the previous example, the autonomous storage robot stuck in Denver may be able to schedule a spot to Dallas on a freelancer's truck, and catch a connecting flight to Memphis. Furthermore, using its inbuilt payment system, the robot may also be able to pay the freelancer for their services.

Autonomous inventory storage robots may also facilitate safe and controlled transfer of goods in the medical and pharmaceutical industry. For instance, pharmaceuticals may often need to be kept at a constant temperature in order to remain safe and effective for the patient. Currently, they are transported in temperature-controlled transportation units comprising electronic sensors for monitoring and recording temperature readings. Further, when the package containing the pharmaceuticals arrives at its destination, the temperature readings may be analyzed to check if the temperature of the package ever went outside of its control conditions and for how long. In this case, the delay in recognizing the problem and deploying a contingency could have moderate to severe consequences. However, with the autonomous inventory storage unit of the present disclosure, deviations in control conditions may be communicated with the sender or receiver's central system in real-time, which may allow for corrective actions to be deployed with minimal time and/or financial loss.

It should be noted that, in addition to power and computing ability, the autonomous inventory units may also have climate control and one or more sensors (e.g., G sensor, temperature sensor, humidity sensor, etc.). Thus, the autonomous inventory unit may be capable of heating and/or cooling its inventory, which may serve to ensure control conditions are met at all times, even when moving between climate-controlled environments.

FIG. 1 illustrates a system 100 configured for directing and controlling an autonomous inventory management system, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of inventory item placing module 108, storage unit directing module 110, event determination module 112, option determination module 114, route recalculating module 116, route selection module 118, arrival location determination module 120, freight carrier communication module 122, and/or other instruction modules.

Inventory item placing module 108 may be configured to place an inventory item such as a product ordered online or otherwise by a customer in an autonomous storage unit. The autonomous storage unit may be a shelf unit or other container-based receptacle. The autonomous storage unit may also be a climate or environmentally controlled container. The autonomous storage unit may self-monitor its geo location (i.e., via a GPS chip) while in route to the first or second arrival location, and report its geo location to a central inventory control system or other central office location or management system. In many embodiments, the autonomous storage unit includes its own drive and control systems to allow it to move about a facility itself and under its own power, without the aid of an operator, driver or other human intervention, as further described in relation to FIGS. 6 and 7. In this regard the autonomous storage unit functions as a robotic and independent transport device.

The autonomous storage unit may receive instructions from the central inventory control system, and may send one or more messages back to an originating sender and inform the originating sender about the status of the delivery progress or other data concerning the shipment. The originating sender may then communicate new instructions to the autonomous storage unit based on the status of the delivery progress. In some cases, a central system may be assigned to the originating sender.

Storage unit directing module 110 may be configured to direct the autonomous storage unit to depart a starting location and to board a first transport system departing for a first arrival location.

Storage unit directing module 110 may also be configured to direct the autonomous storage unit to move to a boarding position at the first arrival location and to direct the autonomous storage unit to board a second transport system departing for a second arrival location. In some cases, the second arrival location may be the final or delivery destination.

Event determination module 112 may be configured to determine whether an event will delay or expedite the arrival of the autonomous storage unit at the first arrival location. In some cases, an event may expedite autonomous storage unit arrival, such as when routes that may better meet the set goals for the autonomous inventory become available. In such cases, a recalculation of routing may be warranted. Option determination module 114 may be configured to determine alternative routing options for the autonomous storage unit to continue travel to the first location.

Route recalculating module 116 may be configured to recalculate the route of the autonomous storage unit to the first arrival location. Route selection module 118 may be configured to select a new route to the first arrival location.

Arrival location determination module 120 may be configured to determine, while at the first arrival location, a second arrival location for the autonomous storage unit.

Freight carrier communication module 122 may be configured to allow the autonomous storage unit to communicate with one or more common freight carriers or other transport services in order to plan a route from the starting location to the first or second arrival location.

In some implementations, determining alternative routing options for the autonomous storage unit may be based on a set of priorities set by a central inventory control system. In some implementations, the autonomous storage unit may be assigned a budget in order to complete its assigned task and alter its routing based on this budget or other defined limitation. In some implementations, by way of non-limiting example, the autonomous storage unit may monitor environmental factors selected from the group consisting of temperature, humidity, vibration, and g-force and relay these environmental factors back to a central inventory control system.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s)

102, client computing platform(s) 104, and/or external resources 124 may be operatively linked via some other communication media.

A given client computing platform 104 may include one or more processors configured to execute computer program modules. The computer program modules may be configured to enable a user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122, and/or other modules. Processor(s) 128 may be configured to execute modules 108, 110, 112, 114, 116, 118, 120, and/or 122, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

In some cases, the autonomous shelf or storage unit may also support diagnostic capabilities, as further described in relation to FIG. 7 below.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2A:
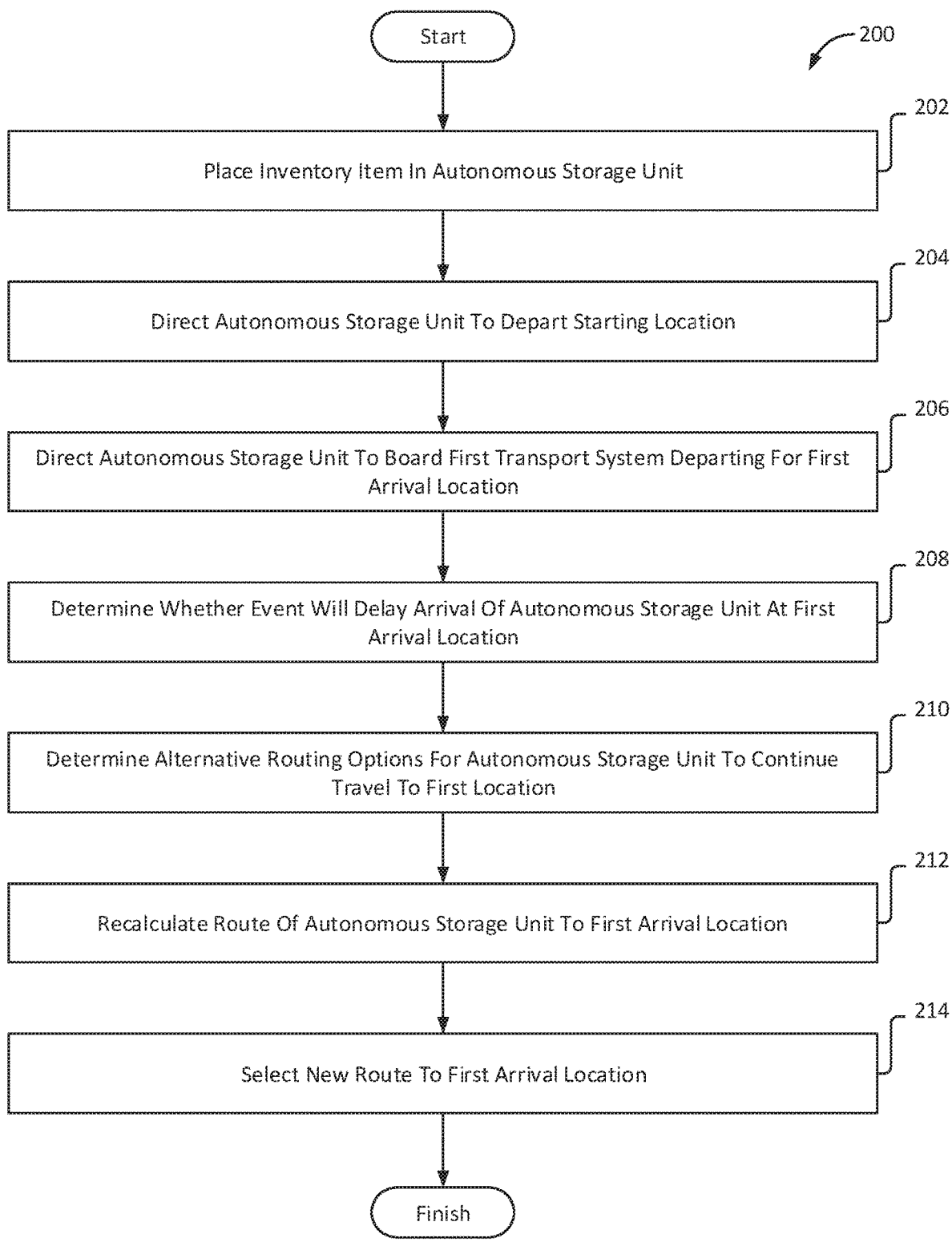
FIGS. 2A, 2B, and/or 2C illustrates methods for directing and controlling an autonomous inventory management system, in accordance with one or more implementations.
Figure 2B:
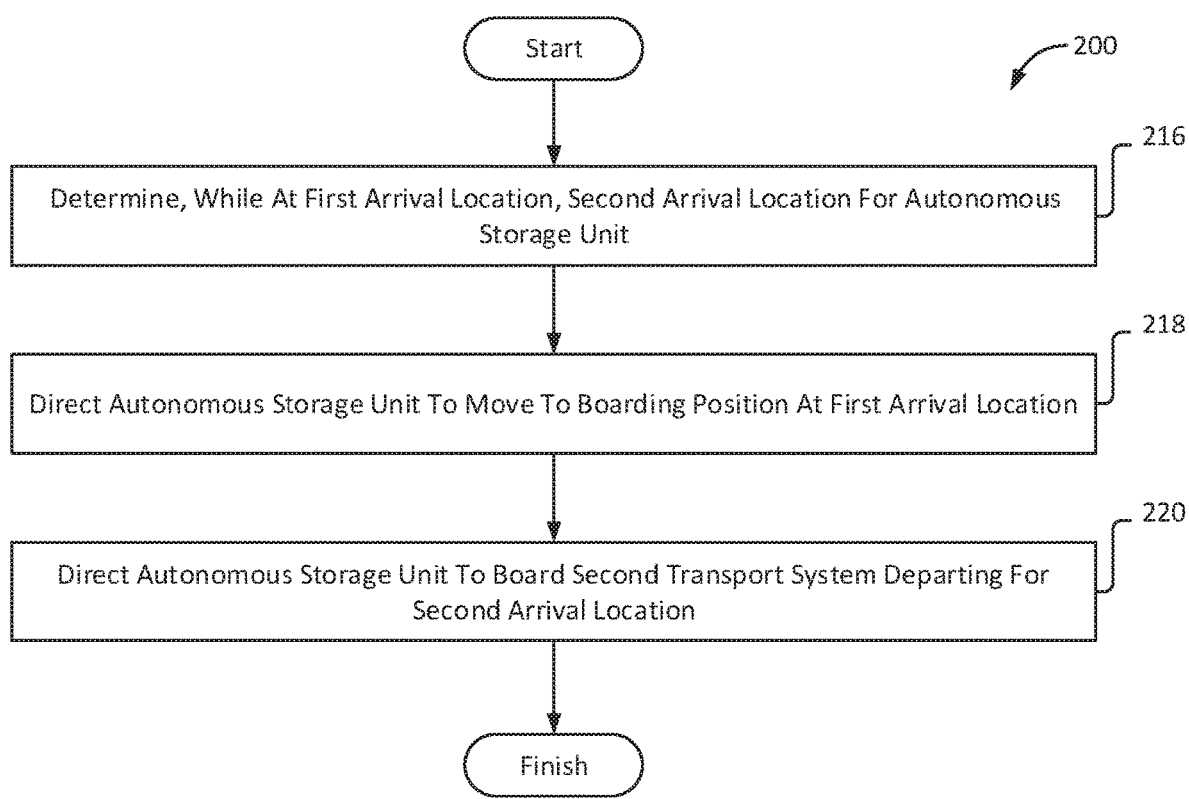

FIGS. 2A, 2B, and/or 2C illustrates a method 200 for directing and controlling an autonomous inventory management system, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, and/or 2C and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2A illustrates method 200, in accordance with one or more implementations.

An operation 202 may include placing an inventory item in an autonomous storage unit such as a self-driving and robotic shelf system or other storage container. Operation 202 may be performed by one or more hardware processors configured by machine-readable instructions including a module that is the same as or similar to inventory item placing module 108, in accordance with one or more implementations.

An operation 204 may include directing the autonomous storage unit to depart a starting location. Operation 204 may be performed by one or more hardware processors configured by machine-readable instructions including a module that is the same as or similar to storage unit directing module 110, in accordance with one or more implementations.

An operation 206 may include directing the autonomous storage unit to board a first transport system departing for a first arrival location. Operation 206 may be performed by one or more hardware processors configured by machine-readable instructions including a module that is the same as or similar to storage unit directing module 110, in accordance with one or more implementations.

An operation 208 may include determining whether an event will delay or expedite the arrival of the autonomous storage unit at the first arrival location. Operation 208 may be performed by one or more hardware processors configured by machine-readable instructions including a module that is the same as or similar to event determination module 112, in accordance with one or more implementations.

An operation 210 may include determining alternative routing options for the autonomous storage unit to continue travel to the first location. Operation 210 may be performed by one or more hardware processors configured by machine-readable instructions including a module that is the same as or similar to option determination module 114, in accordance with one or more implementations.

An operation 212 may include recalculating the route of the autonomous storage unit to the first arrival location. Operation 212 may be performed by one or more hardware processors configured by machine-readable instructions including a module that is the same as or similar to route recalculating module 116, in accordance with one or more implementations.

An operation 214 may include selecting a new route to the first arrival location. Operation 214 may be performed by one or more hardware processors configured by machine-readable instructions including a module that is the same as or similar to route selection module 118, in accordance with one or more implementations.

FIG. 2B illustrates method 200, in accordance with one or more implementations.

An operation 216 may include determining, while at the first arrival location, a second arrival location for the autonomous storage unit. Operation 216 may be performed by one or more hardware processors configured by machine-readable instructions including a module that is the same as or similar to arrival location determination module 120, in accordance with one or more implementations.

An operation 218 may include directing the autonomous storage unit to move to a boarding position at the first arrival location. Operation 218 may be performed by one or more hardware processors configured by machine-readable instructions including a module that is the same as or similar to storage unit directing module 110, in accordance with one or more implementations.

An operation 220 may include directing the autonomous storage unit to board a second transport system departing for a second arrival location. Operation 220 may be performed by one or more hardware processors configured by machine-readable instructions including a module that is the same as or similar to storage unit directing module 110, in accordance with one or more implementations.

Figure 2C:
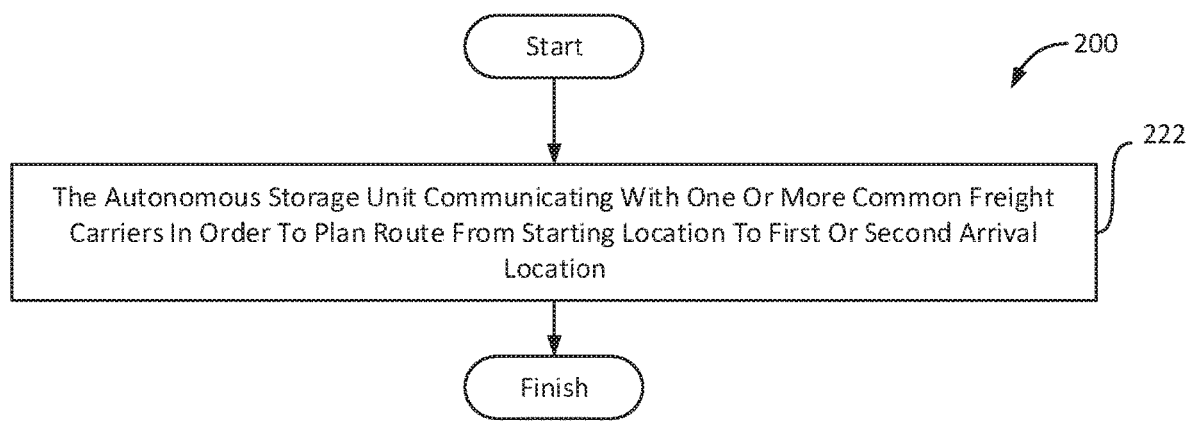

FIG. 2C illustrates method 200, in accordance with one or more implementations.

An operation 222 may include the autonomous storage unit communicating with one or more common freight carriers in order to plan a route from the starting location to the first or second arrival location. Operation 222 may be performed by one or more hardware processors configured by machine-readable instructions including a module that is the same as or similar to freight carrier communication module 122, in accordance with one or more implementations.

Figure 3:
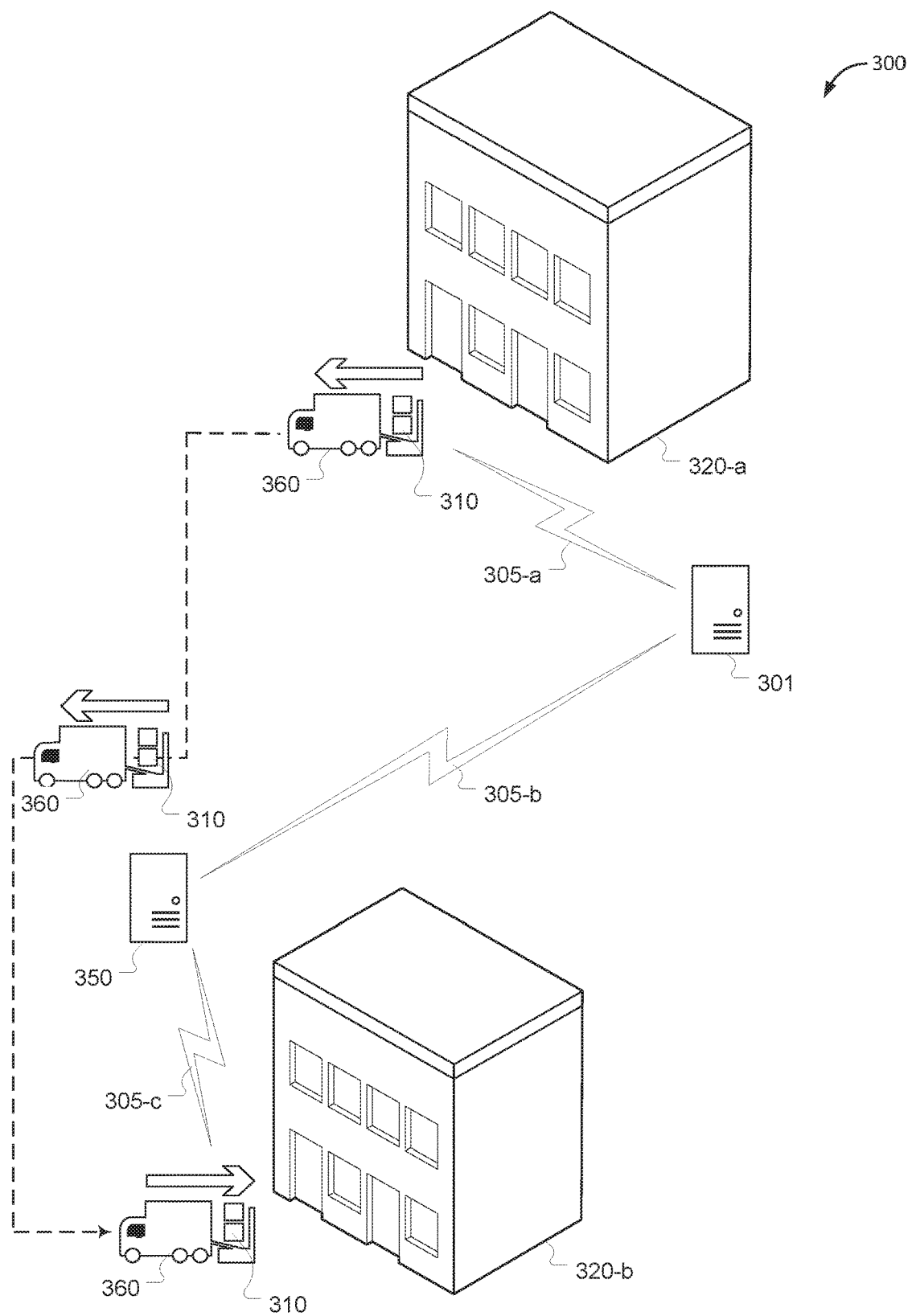
FIG. 3 illustrates a sample mobile inventory transport communication network in accordance with embodiments described herein.

FIG. 3 illustrates a sample mobile inventory transport communication network 300, according to an embodiment of the disclosure. The mobile inventory transport communication network may include a first central system 301, a first MITU 310, a second central system 350, and a transportation system 360. In some embodiments, the first central system 301 may be an example of a warehouse or inventory dispatch system located at a warehouse and may be responsible for managing inventory demands received from the second central control system 350. The first central system 301 may be similar or substantially similar to the central inventory control system described in FIG. 1. Further, the second central system 350 may be an example of a retail system located at a retail location, such as a grocery store, a department store, shopping mall, etc.

In some cases, second central system 350 may be in communication with the first central system 301. Further, first central system 301 and/or second central system 350 may communicate schedule, routing, and unit demands for autonomous storage units or MITUs between different geographic sites.

The first central system 301 may be responsible for the cataloging and scheduling of all connected autonomous storage units or MITUs (e.g., MITU 310) that may be operating in the central systems communication network. The first central system 301 schedules the movements of the MITUs in response to demands at differing physical locations in the network. In some cases, first central system 301 may be in communication with one or more different central systems to respond to additional inventory demands outside the geographic region within which central system 301 operates. First central system 301 incorporates software and hardware to organize, schedule, and carry out the movements of the autonomous storage units or MITUs by communicating with the MITUs' local control devices. First central system 301 is also in communication with transportation systems that may be within the network. Such communication may be by Wi-Fi, cellular, Bluetooth, or any other communication means.

As an example, first central system 301 may receive an indication that a package or an inventory item needs to be delivered to the second geographic location 320-b. In some embodiments, one or more MITUs (including MITU 310) at the first location may be in communication with the first central system and may also receive a ping or notification of this indication. As noted above, MITUs may be aware and knowledgeable of the inventory they are holding, and in this example, MITU 310 may realize that it is already loaded with the inventory desired at the second geographic location, and thus, best suited to handle the particular inventory demand. In such cases, MITU 310 may notify the first central system that it has the inventory in possession, upon which MITU 310 or the first central system schedules transport of the MITU 310 to the second location 320-b on transportation system 360. In some cases, the central system 301 may schedule the transport of the MITU 310 via one or more waypoints (not shown) before the package is delivered to the second location.

In some circumstances, once the transportation system 360 receives the MITU 310 in the first geographic location 320-a, the MITU 310 may be in communication 305-a or 305-b with either of the central systems during its journey to the second geographic location 320-b. Additionally or alternatively, the transportation system 360 may be in communication with one or more of the central systems.

It should be noted that, transportation system 360 may be a variety of transportation systems including conveyors, elevators, or vehicles (e.g., automobiles, trucks, trains, aircrafts, boats, and/or ships). Transportation system 360 is primarily responsible for moving autonomous storage units or MITUs between different geographic points. For example, this may be accomplished by a conveyor system at a single geographic site which moves MITUs from one point to another, or it could be accomplished by loading MITUs into a vehicle and moving the MITUs to a second geographic region. Importantly, transportation system 360 and/or MITU 310 is in communication with one or more central systems (e.g., first central system 301, second central system 350, etc.), and the scheduling and movement performed by transport system 360 may be monitored by a central system in order to allow for autonomous movement of the MITUs. For example, first central system 301 may communicate scheduling information to transportation system 360 and the MITUs. Further, transportation system 360 may receive the MITUs that the first central system 301 has scheduled. Once transportation system 360 has received the autonomous storage unit, it transports the autonomous storage units to a second location. In some examples, such a location could be across a single warehouse. In some other examples, such a location could extend across a larger geographic area, such as a city, state, or even a country.

In some examples, once the MITU 310 is loaded on the transportation system, it may continue to remain in direct communication with at least the first central system 301, the second central system 350, or both. Alternatively, the MITU 310 may remain in direct communication with the first central system 301 until it reaches the second geographic site 320-b, following which it aborts communication with the first central system 301, and switches to communicating with the second central system 350.

In some other examples, the MITU 310 may remain in communication with the one or more central systems via the transportation system 360. For instance, the autonomous storage unit or MITU 310 may communicate with the transportation system via one or more limited range communication techniques (e.g., Bluetooth or Near field Communications (NFC)), while the transportation system 360 may communicate with the central systems via one or more longer range techniques.

In some examples, the transportation system 360 and the MITU 310 may utilize a variety of techniques for communicating with the central systems, including cellular technology and Wi-Fi. Additionally or alternatively, the MITU 310 or the transportation system 360 may comprise GPS tracking chips, allowing their locations to be tracked in real-time by the central systems, which may serve to alleviate issues arising from inadequate cellular coverage (i.e., dead zones), or when the MITU 310 and its components are turned off to conserve power. It should be noted that the MITU 310 is autonomous and may be aware of the inventory it is holding, delivery deadlines, control parameters for the inventory, such as temperature, humidity, vibration considerations, as well as the tasks it needs to complete at the second geographic site 320-b, prior to even leaving the first geographic site 320-a.

Figure 4:
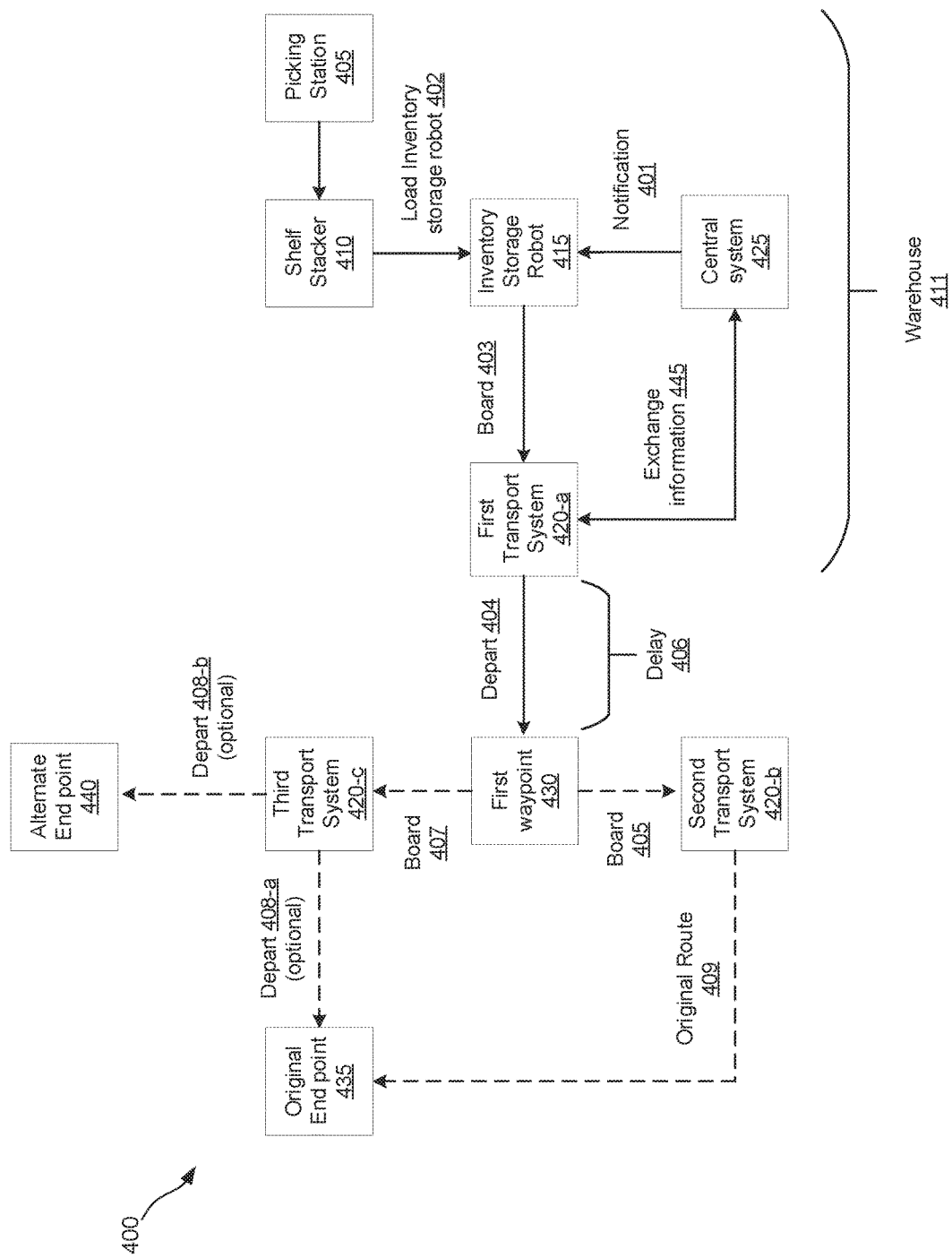
FIG. 4 illustrates a process flow for a sample mobile inventory transport communication network, in accordance with embodiments described herein.

In one example, the MITU 310 may travel to the second geographic site 320-b via a waypoint (not shown), but further described in relation to FIG. 4. Further, the MITU 310 may be scheduled to disembark the transportation 360 at the waypoint and board a second transportation system (not shown) heading towards the second geographic site. In such cases, the MITU 310 may tracks its location in real-time, for instance, to ensure it can arrive in time at the waypoint for its second leg of the journey. In some cases, the transportation system 360 may be delayed due to unforeseen circumstances, such as traffic, road construction, weather, etc. Further, MITU 310 may notify the first central system 301 of such delays even before it arrives at the waypoint. In this example, the MITU 310 may identify an alternate route or mode of transport to reach the second geographic site at or before its scheduled delivery time. For instance, the MITU 310 may have access to time-tables of various couriers and freight companies, using which it may select an appropriate route to the second geographic site (i.e., based on scheduled departure/arrival times from the waypoint). As described above, while rerouting, the MITU 310 may employ rules-based strategies, such as prioritize one of time or cost or minimum number of additional waypoints, etc. For instance, if the autonomous storage unit is configured to prioritize time, the autonomous storage unit may choose faster or more reliable methods of transport (e.g., trains or airplanes) from the waypoint to the second geographic location. In other cases, the autonomous storage unit may be configured to prioritize cost, and may reroute itself to the final destination via multiple waypoints or cheaper methods of transport such as trucks or boats.

In some circumstances, the autonomous storage unit or MITU 310 may be configured to schedule its new route, different from the original route, independently. In other cases, the MITU 310 may notify central system 301 that it has missed its connection. The central system 301 may be configured to update the MITU's mission. For instance, rather than continuing on to the second geographic location 320-b, the central system 301 may redirect the MITU 310 to another customer or receiver at a third geographic location, while sending another autonomous storage unit containing an identical package from the first geographic location 320-a to the second geographic location 320-b via a faster method, such as air transport. Furthermore, the MITU 310 or the central system 301 may determine a new route to the third geographic location via one or more transportation systems available for use at the waypoint.

Thus, as shown, one or more central systems may choreograph the movement of one or more autonomous storage units or MITUs between geographic areas that each central system is responsible for. This creates an interconnected network of central systems that facilitates organized movement of autonomous storage units or MITU's between multiple geographic locations, while responding to the demands of multiple systems.

FIG. 4 illustrates a sample mobile inventory process flow 400, according to an embodiment of the disclosure. The mobile inventory process flow 400 may be implemented at a warehouse 411, comprising a central system 425, an inventory storage robot 415, a shelf stacker 410, and a picking station 405. Further, the mobile inventory process flow 400 may also be implemented at a first waypoint 430, second and third transport systems 420-b and 420-c, and optionally an endpoint 435 and an alternate end point 440.

In some examples, the endpoint 435 may be located at a second different geographic location than the warehouse 411 and may optionally comprise a second control system (not shown). Further, the alternate endpoint 440 may be located at a third geographic location and may also comprise a third central system (not shown). In some examples, the inventory storage robot may be an example of the autonomous storage units or MITUs described in relation to FIGS. 3, 6 and 7, and the central systems, including central system 425, may be examples of the first or second central systems 301 and 350 described in FIG. 3. Further, in some cases, inventory storage robot 415 may also be referred to as a MITU, an autonomous storage unit, or a smart rack robot.

In some embodiments, inventory storage robot 415 may include an inventory storage device, including one or more shelves, buckets, augers, arms, and climate-controlled units for storing a plurality of physical items. In some embodiments, the inventory storage robot 415 may be employed to meet inventory or package demands at original endpoint 435. Upon receiving a notification 401 pertaining to the inventory demands at the original endpoint 435, inventory storage robot may transport itself to picking station 405 for loading by the shelf stacker 410 at 402. It should be noted that the shelf stacker 410 may be a worker employed at the warehouse 411 or may be an automated robot that is configured to load/unload inventory storage robots. In some examples, if the shelf stacker 410 is in front of the inventory storage robot 415, inventory storage robot 415 may highlight the part of each shelf that needs replenishment, as well as the quantity of the inventory items.

In some cases, the inventory storage robot 415 may be operationally configured to determine information pertaining to the inventory it is holding. For instance, inventory storage robot 415 may determine one or more of a name, a description, a quantity, a bar code or stock keeping unit (SKU), a price, a weight, a dimension, and a location within the inventory storage robot for one or more items held by the robot. In some cases, the inventory storage robot 415 may also comprise one or more cameras, Radio Frequency Identification (RFID) readers, or weigh scales for tracking and identifying inventory.

In some embodiments, the inventory storage robot 415 may comprise one or more visual indicators, such as a row of lights (e.g., Light Emitting Diode (LED) lights) and the robot portion or the inventory storage device may be configured to illuminate one or more lights or an entire row of lights to assist a shelf stacker during loading/unloading. Additionally, or alternatively, a display (e.g., LED display, LCD, or another HD display) may be mounted on the inventory storage device for displaying a price or other key product information.

After loading the inventory storage robot at 402, the inventory storage robot 415 or the central system 425 may schedule transport of the robot to the original endpoint 435 via a transportation system 420-a, as previously described in relation to FIG. 3.

The inventory storage robot may board 403 the first transport system 420-a and depart 404 towards the first waypoint 430. During its first leg of the journey from the warehouse 411 to the first waypoint 430, the inventory storage robot may determine that it is experiencing a delay 406 based in part on GPS information, or comparing current time with scheduled arrival time and/or estimated arrival time, etc. Upon arriving at the first waypoint 430, the inventory storage robot may determine that it has missed boarding 405 the second transport system 420-b, and may not be able to follow original route 409 to the original end point 435. As described in FIG. 3, the inventory storage robot 415 may then board 407 a third transport system 420-c based in part on rerouting instructions received from the central system 425. In some examples, the third transport system 420-c may depart 408-b the first waypoint 430 and deliver inventory storage robot 415 to alternate endpoint 440. In this way, while the inventory storage robot 415 was unable to meet the inventory demands at the original endpoint 435 due to delay 406, it may still meet inventory demands at the alternate endpoint 440, which may be facilitated by exchanging information 445 with the central system 425 in real-time.

In some embodiments, the inventory storage robot 415 may be configured for autonomous decision making. For instance, autonomous decision making at the robot may be limited by scope provided by the central system 425. In one example, the inventory storage robot may be provided a budget (e.g., $100, $500, $1000, etc.) for completing its mission while facing unforeseen circumstances, such as delay 406. In such cases, the inventory storage robot may be configured to connect with other transportation systems or couriers not including in the original route 409 to complete its mission. For instance, as an example, second transport system 420-b may be a semi-truck and original route 409 may involve a 6-hour road journey to original endpoint 435. In this case, after the delayed arrival at the first waypoint 430, inventory storage robot may determine that a scheduled flight (e.g., third transport system 420-c) departing the first waypoint 430 may allow it to meet the delivery deadline at the original endpoint 435. The inventory storage robot may then book a spot on the departing flight, for instance, by utilizing the budget provided by the central system. In other cases, the central system 425 may be configured to book the departing flight on behalf of the robot and may notify the robot of the same. As shown, in some cases, the third transport system 420-c may then depart 408-a the first waypoint 430 and deliver inventory storage robot 415 to the original end point 435.

Figure 5:
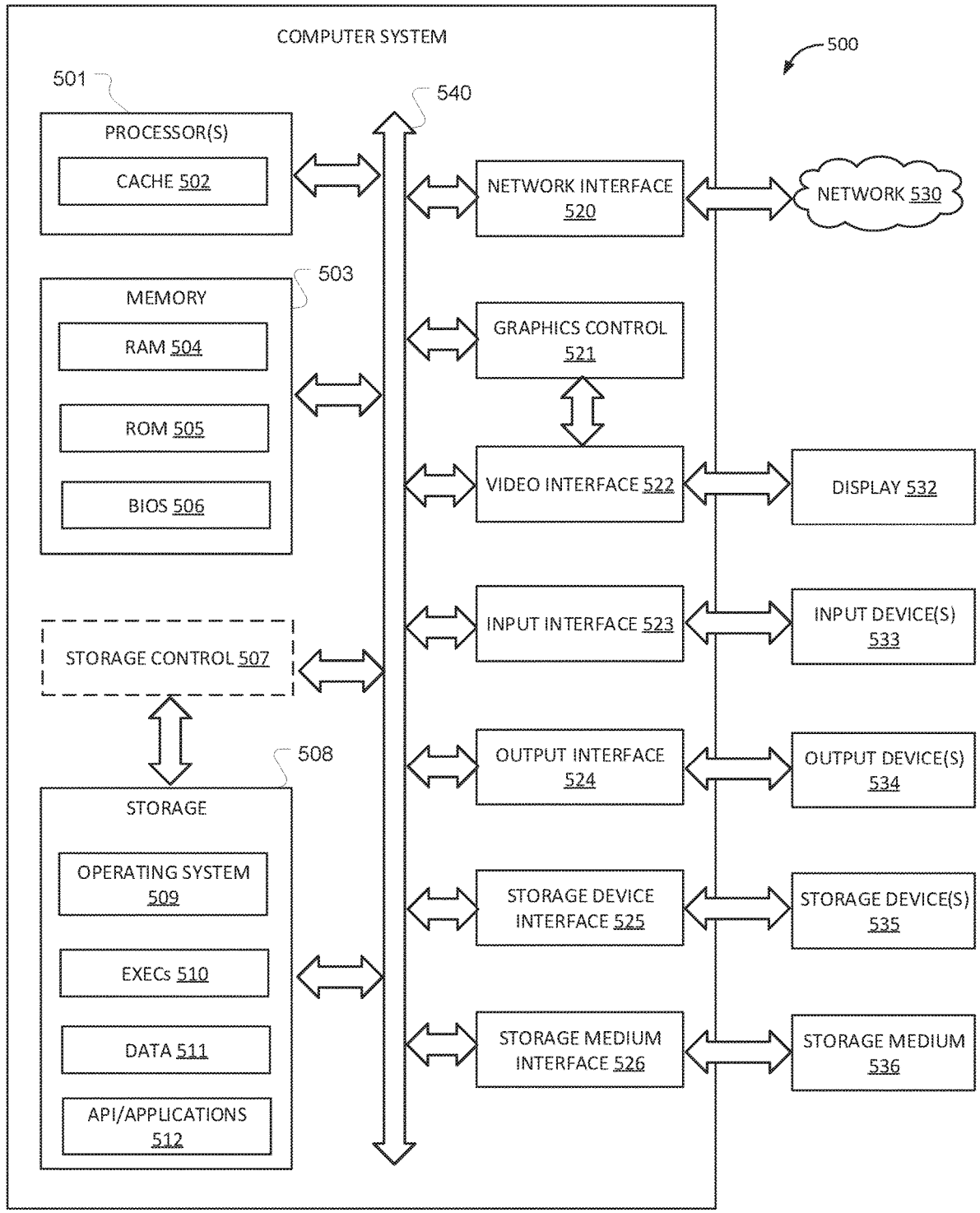
FIG. 5 is a block diagram depicting an exemplary machine that includes a computer system within which a set of instructions can be executed for causing a device to perform or execute any one or more of the aspects and/or methodologies of the present disclosure.

Referring to FIG. 5, it is a block diagram depicting an exemplary machine that includes a computer system 500 within which a set of instructions can execute for causing a device to perform or execute any one or more of the aspects and/or methodologies of the present disclosure. The components in FIG. 5 are examples only and do not limit the scope of use or functionality of any hardware, software, embedded logic component, or a combination of two or more such components implementing particular embodiments.

Computer system 500 may include a processor 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer readable instructions. Computer system 500 may provide functionality for the components depicted in FIGS. 1-2C as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random-access memory component (e.g., RAM 304) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, EXECs 510 (executables), data 511, API applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition, or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Figure 6:
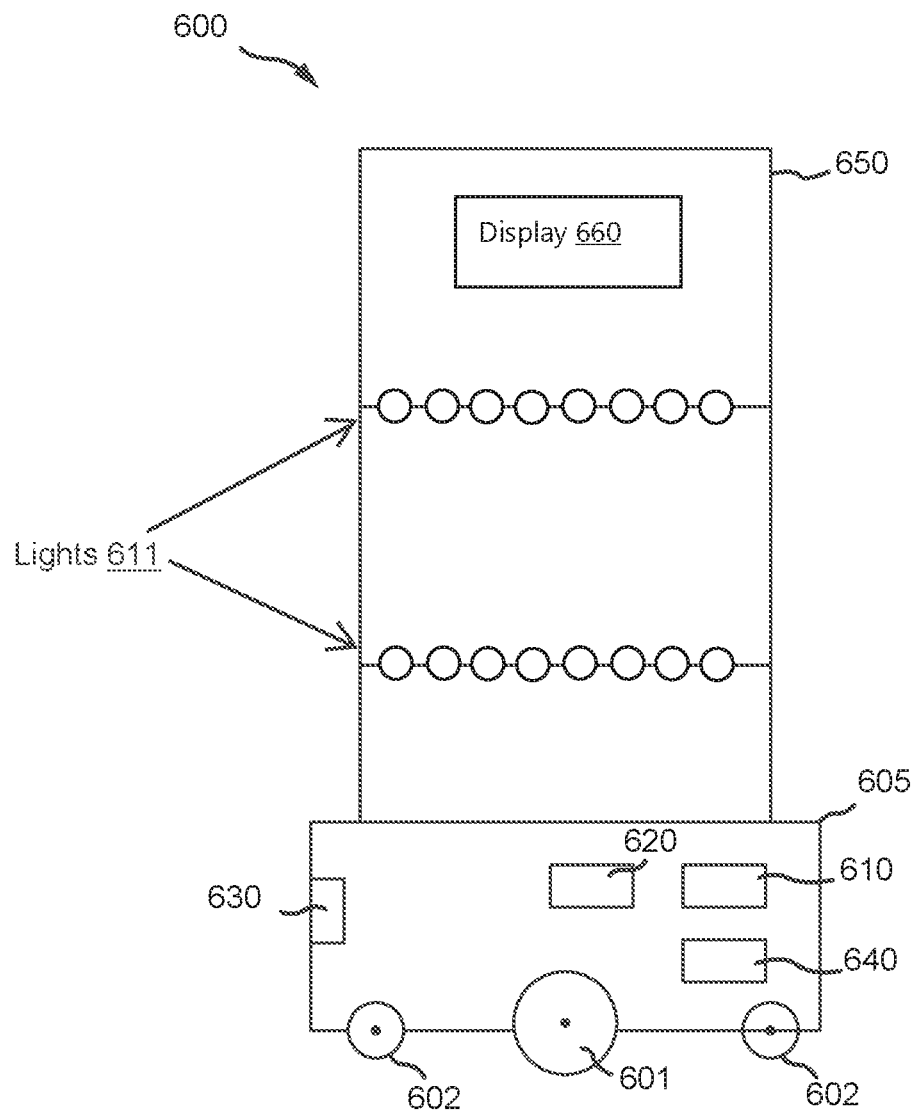
FIG. 6 illustrates a sample mobile inventory transport unit (MITU) in accordance with embodiments described herein.

FIG. 6 illustrates an example of a Mobile Inventory Transport Unit (MITU) 600. In some cases, MITU 600 may also be referred to as a smart rack robot, an autonomous smart rack robot, or an autonomous inventory storage unit. In some cases, MITU 600 may comprise a robot portion, including at least drive device 601, balance device 602, control device 610, navigation device 620, sensing device 630, and power device 640. Further, the MITU 600 may comprise a structural portion including at least housing 605 and inventory storage device 650. In some examples, the robot portion of the MITU 600 may be shaped like a cube, a cuboid, a cylinder, or any other shape, and may comprise one or more wheels and balance devices on its lower portion. In some other cases, the robot portion may be surrounded by, or substantially surrounded by the housing device 605. Further, the robot portion may be in electronic communication (either wired or wireless) with the housing device 605 and/or the inventory storage device 650.

In some examples, housing 605 encloses the electrical and physical components of contained within MITU 600. Housing device 605 is physically coupled to an inventory storage device and serves as the base for the inventory storage device. Importantly, the physical coupling conjoins the inventory storage device and the housing device 605 such that the two devices function as one physical object. In some cases, the housing device 605 and the inventory storage device may be joined via screws, nuts and bolts, nails, any other type of fastener, or even welding.

Inventory Storage

MITU 600 includes inventory storage device 650. Inventory storage device 650 stores physical items, such as inventory, that MITU 600 moves from at least a first physical location to a second physical location, or even multiple locations. Inventory storage device 650 may be a variety of storage devices including shelves, buckets, augers, and arms. Additionally or alternatively, the inventory storage device 650 may also comprise climate controlled units for handling and transporting items (e.g., pharmaceuticals, vaccines, blood for blood banks or blood donation drives, perishable goods, beverages, etc.) that need to be kept at a certain goal temperature, further described in relation to FIG. 7. As shown, inventory storage device may be physically coupled to housing device 605. In other words, the physical coupling of housing device 605 and inventory storage device 650 creates one physical object. As shown, in some examples, the housing device 605 and inventory storage device 650 may be in the form of a cube or a cuboid, and may be joined together via welding, or using one or more fasteners. In some other cases, a rod or pole (not shown) may pass through the center of the housing device 605, where the rod is affixed to the upper portion of the housing device 605. Further, the inventory storage device 650 may be installed on or around the rod, such that the rod passes through one or more shelves of the inventory storage device (i.e., shelves are perpendicular to the rod).

As indicated above, the inventory storage device 650 coupled with the robot portion of the MITU 600 may collectively be referred to as a smart rack robot. In some instances, upon loading, the inventory storage device may be operationally configured to determine information pertaining to the inventory it is holding. For instance, the smart rack robot may determine one or more of a name, a description, a quantity, a bar code or stock keeping unit (SKU), a price, a weight, a dimension, and a location within the inventory storage device for one or more items held by the storage device.

In some embodiments, the inventory storage device 605 may receive power from power device 640 of the robot portion of the MITU 600, for instance, to power lights or a display mounted on the inventory storage device. Additionally, or alternatively, the inventory storage device 605 may also comprise a power source (not shown), which may be used as a backup for power device 640. In some cases, the power may be transferred via cabling running through the center of the robot portion and the housing device 605. For instance, one or more power cables may be installed around or inside the center rod (or pole) of the MITU 600. In one example, the robot portion of the MITU 600 may be configured to rotate inside the housing device 605, for instance, when MITU 600 is turning at a corner. In such cases, a slip ring may be used to supply power and data to from the power device 640 to the inventory storage device 605. Slip rings may be examples of electromechanical devices that allow the transmission of power and electrical signals from a rotating object (e.g., robot portion) to a stationary structure (e.g., inventory storage device).

In some other cases, the power may be transferred wirelessly (e.g., resonant inductive coupling) or via an NFC connection. For instance, the housing device 605 and the inventory storage device 650 may comprise NFC antennas that are coupled and spaced a distance (e.g., 1 mm, 2 mm, 1 cm, 2 cm, etc.) apart, allowing bidirectional transfer of power and data. The NFC antennas may be microstrip patch antennas (e.g., square, rectangle, circular, elliptical, or any other continuous shape) fabricated on the surface of a printed circuit board (PCB). Further, the substrate of the PCB may be composed of a dielectric material, such as Gallium Nitride (GaN), Gallium Arsenide (GaAs), epoxy resin, Teflon, ceramic, etc.

In some embodiments, the inventory storage device 650 may comprise one or more visual indicators, such as a rows of lights 611 (e.g., Light Emitting Diode (LED) lights). Further, the robot portion or the inventory storage device 650 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy.

Additionally, or alternatively, the visual indicator may comprise a display 660, which may be mounted on the inventory storage device 650, for instance, when the MITU is configured to be deployed in a retail setting. In some cases, the display 660 may be an example of a Liquid Crystal Display (LCD), a LED display, or another High Definition (HD) display. In such cases, the display 660 may be used to display a price, or other key product information such as product specification, nutrition information and/or ingredients (if applicable), or even a product image. In some examples, the inventory storage device 650 may comprise one or more buttons adjacent (e.g., above or below) a slot or shelf on which a product is placed, and a user may view product information on the attached display by clicking the said buttons. In some embodiments, the inventory storage device may also comprise one or more cameras, Radio Frequency Identification (RFID) readers, or weigh scales for tracking inventory. In one example, a camera mounted on the inventory storage device 650 may capture images or video feeds, based on which the MITU may determine information pertaining to an item (e.g., description, quantity, etc.) that was taken off a shelf. In other cases, a RFID reader may scan RFID tags attached to items or products remaining on the shelf in order to determine the items (e.g., description, quantity, etc.) that were taken off the shelf. In yet other cases, a built-in weighing scale may be used to correlate the weight of the removed items to the weights and locations of different items initially stored in the inventory storage device 650. It should be noted that the inventory storage device may incorporate one or more of the inventory tracking techniques described above.

Upon detecting the removal of one or more items from its shelves, the inventory storage device 650 may be configured to update its inventory level and relay that information to a retail store based system or to the manufacturer (e.g., if the retailer utilizes pull-based replenishment methods). In other cases, the inventory storage device may also be configured to alert or advise the retail store, for instance, if a customer incorrectly placed an item on its shelves. In yet other cases, the inventory storage device may be configured to issue alerts when it realizes that it is being loaded or unloaded at a time outside a scheduled or authorized time period. In some cases, the inventory storage device may flash blinking red lights or sound an audible alarm to a user of the MITU in response to such events.

Drive

In some embodiments, the MITU is configured to account for various anomalies in the environment, such as raised surfaces or other varying terrain. In those cases, the MITU may be adapted to maneuver in these environments as well. MITU 600 includes drive device 601. Drive device 601 supplies the method of moving MITU 600. Drive device 601 may be a variety of locomotion devices including one or more wheels, treads, or actuators. In some cases, drive device 601 may comprise four wheels, one on each edge or side of MITU 600. In some cases, one or more wheels may be raised up while the MITU 600 is traveling in a straight line. In some other cases, all four wheels may be in contact with the ground, for instance, to turn the MITU 600. In some embodiments, drive device 601 and control device 610 may control the pace at which the wheels rotate (i.e., same or different pace), allowing the MITU 600 to turn or take corners. In some examples, the MITU 600 may receive terrain information while navigating through a particular area from one or more other MITUs that have previously navigated through the same area, or alternatively, from a control system of a mobile inventory transport communication network. In other cases, the MITU 600 may identify variations in terrain in real-time, for example, via one or more sensors. The sensors may be selected from a group consisting of an accelerometer, a gyroscope, or any other sensors configured to register rapid variations in movement or spring displacement, which may indicate the presence of rough terrain. In other cases, the MITU 600 may support an "off-road" mode, which may include one or more of changing its suspension profile, spring dampening effects, and ground clearance.

In some examples, MITU 600 may be bipedal (2), quadrupedal (4), or hexapedal (6), and drive device 601 may comprise one or more legs. In some other examples, MITU 600 may comprise a combination of wheels and legs and may be referred to as a hybrid transport unit. In yet other examples, drive device 601 may enable MITU 600 to navigate by slithering (i.e., in a snake like motion). In some aspects, drive device 601 is the primary method for physically moving MITU 600 from a start point to an end point.

Balance

In some cases, MITU 600 may include balance device 602. In some cases, balance device 602 may supply weight distribution of MITU 600 and may offset the force exerted by drive device 601 when MITU 600 is either stationary or moving. In some examples, balance device 602 may incorporate a variety of balance devices including one or more wheels, one or more bearings, or a fixed apparatus. For instance, balance device 602 may be composed of two wheels, one in the front and one in the rear of the MITU 600. In some other cases, balance device 602 may comprise one or more sensors, such as a gyroscope, an accelerometer, or a combination. A gyroscope may be an example of a device used for measuring or maintaining orientation and/or angular velocity, and the orientation of the MITU 600 may be adjusted based in part on the output readings from the gyroscope. In some examples, a gyroscope or an accelerometer may be used in combination with a controller (e.g., a proportional-integral-derivative (PID) controller) to balance the MITU 600. In one example, MITU 600 or a control device 610 of MITU 600 may gather readings from one or more sensors (e.g., accelerometer or gyroscope) installed within the MITU. Further, MITU 600 may calculate an altitude (i.e., angle with respect to the horizon, or a surface the MITU is traveling over), compare the angle with a target angle (e.g., 0 degrees if it's a flat surface, 15 degrees, 30 degrees, etc., if it's an incline), and calculate a difference between the two angles. Based on the difference between the angles, the drive device 601 may cause the MITU 600 to accelerate (or decelerate) until the difference between the angles is reduced to zero to preserve the balance.

Navigation, Sensing & Control

In some cases, the housing 605 may comprise one or more slots or openings for a sensor or sensing device 630. Further, the sensing device 630 (e.g., camera, or object detection device) may be installed such that it is aligned or substantially aligned with the one or more slots or openings. In some examples, there may be a slot or opening on each side or edge of the housing, allowing a 360-degree field of view at the MITU 600. In some embodiments, one or more edges of the housing 605 (e.g., front edge) may comprise an additional opening behind which a one or more other sensors (e.g., a LIDAR sensor) may be installed.

MITU 600 includes control device 610. Control device 610 locally controls the autonomous movement of MUTU 600 in response to multiple inputs. Control Device 610 includes a control unit which incorporates software and hardware into autonomous control of MITU 600. Control device 610 may be in communication with multiple other systems including one or more central systems (e.g., warehouse system, retail system), transportation systems (e.g., vehicles or transportation providers utilized to relocate the MITU from one geographic site to another), or even other MITUs or smart rack robots, to control the movement of MITU 600 in response to these systems' requirements. In some cases, such communication may be facilitated via Wi-Fi, Bluetooth, Near Field Communication (NFC), Cellular, Radio, or any other means.

Control device 600 is also in communication with sensing device 630 and respond to physical objects that sensing device 630 may detect. Control device 610 is also in communication with drive device 601 to control the movement of MITU 600. In some cases, control device 610 may include an analog to digital (ADC) converter to convert analog readings (or signals) from the various sensors into digital signals and may also incorporate a feedback loop. As an example, MITU 600 may be configured to travel in a straight-line while being surrounded on both sides by other objects (e.g., robots, shelves, etc.), a typical scenario inside a warehouse. Further, the control device 610 may receive information pertaining to the objects from the sensing device 630. In some cases, the sensing device 630 may comprise one or more infrared object detectors that can measure the distance from the left and right sides of the MITU 600 to the objects. The sensing device 630 may create a continuous analog voltage that depends inversely on the distance to the objects. In some cases, the analog voltage may be passed on to the ADC converter in the control device 610, following which the control device 610 computes an error (e.g., a difference between readings from the left and right sides of the robot), and adjusts the inputs to the drive device 601 until the error is reduced to zero.

MITU 600 includes navigation device 620. Navigation device 620 determines the physical position of MITU 600 and communicates the location data to the control device 610. Navigation device 620 may incorporate a variety of methods of location identification including one or more of Global Positioning System (GPS), 802.11 Wi-Fi, Cellular, Quick Response (QR) codes, barcodes, Radio-Frequency Identification (RFID), Near Field Communication (NFC), magnetic positioning, Ultra-wide band (UWB), ultrasound, etc. While GPS and cellular methods of location identification suffice for outdoor applications, they lack accuracy and reliability indoors, especially in large multistory buildings (e.g., warehouses, hotels, office buildings), airports, parking garages, and underground locations. In such cases, alternate techniques and devices may be utilized to provide indoor position, which may range from Wi-Fi and Bluetooth antennas to purpose-built installations with relays and beacons.

In some other cases, QR codes or barcodes may be affixed to known locations inside the warehouse or indoor structure navigated by the MITU 600. For instance, a MITU 600 navigating within a warehouse or building may be able to determine its location based on scanning and decoding the QR codes. In some cases, the MITU 600 may be aware of the QR code associated with an end point within the warehouse. In such cases, the MITU may navigate (e.g., in straight lines between QR codes), until the end point is reached. In one example, localization of the MITU 600 may be determined from odometry readings gathered from the drive device 601. For instance, the control device 610 or the drive device 601 may maintain an accurate count of the number of times the drive device 601 or a motor turning the wheels has turned. Further, since the diameter of the wheel and the starting point is known, the localization of the MITU 600 may be determined by calculating straight line distances between two adjacent points. As an example, if MITU 600 is navigating between a starting point A and an ending point F, via intermediate points B, C, D, and E, the control device 610 or drive device 601 may compute the number of times the drive device 601 needs to turn in order to ensure MITU 600 reaches point B, recalculates the number of times the drive device 601 needs to turn to reach point C (i.e., once point B is reached), and so on. In some cases, the MITU 600 may determine it has reached an intermediate point based on scanning a QR code at that point. In some examples, the QR codes may be affixed to the floor, on the ceiling, or another known location. Further, the QR codes may be visible (e.g., printer ink) or invisible (e.g., UV ink, infrared ink, etc.) to the naked human eye. In some cases, a camera, or QR code or barcode reader on the MITU 600 may be configured to scan and identify codes painted in ink invisible to the human eye. Additionally, or alternatively, the MITU 600 may comprise one or more infrared LEDs for illuminating targets, which can then be identified by the camera or QR code reader. It should be noted that this camera or barcode reader may be the same as, or in addition to the camera and barcode reader utilized by the inventory storage device 650, described above.

MITU 600 includes sensing device 630. Sensing device 630 responds to physical object present near MITU 600. Sensing device 630 may incorporate a variety of sensing methods, with the primary ones being visual or infrared cameras, although others including LIDAR, Radar, Laser, ultrasound (or ultrasonic) are also envisioned. Sensing device 630 communicates the physical object data to control device 610. Single or multiple camera configurations may be incorporated in order to provide stereo camera implementations to extract other data such as depth information. In some cases, the sensing device 630 may generate a 3D virtual rendition of the warehouse or building to assist MITU 600 during navigation. In some circumstances, the MITU 600 may combine the 3D virtual model of its navigating environment with real data, such as, but not limited to, physical building measurements, real-time acquired robot's position (i.e., based on rotation of wheels, QR codes, etc.), and data acquired from laser scanning to further enhance and visualize object detection for navigation. In some other cases, the sensing device 630 may deploy a technology, referred to as Simultaneous Location and Mapping (SLAM), where data from multiple sensors may be fused together to enable the MITU 600 to locate itself in a predetermined map without the use of fixed markers (e.g., QR codes, beacons, RFID tags, etc.). It should be noted that while SLAM improves navigation flexibility as compared to QR codes, SLAM may be more difficult or costly to implement.

Power

MITU 600 includes power device 640. Power device 640 supplies power to various components of MITU 600. Power Device 640 may be in electrical communication with drive device 601, control device 610, navigation device 620, sensing device 630, and inventory device 650. In some cases, power device 640 may be a battery, a fuel cell, a solar cell, to name a few non-limiting examples. In other embodiments, inductive charging or magnetic resonance charging (i.e., wireless power transfer) may be utilized, which may allow the robot or MITU 600 to charge while moving, such as when the robot is moving up and down aisleways, or when MITU 600 is loaded on the transport vehicle. In such cases, the MITU 600 may not need to dock to a charge station. In some cases, inductive charging plates may be installed in transport vehicles, warehouses, retail stores, etc., that the MITU 600 may park on for wireless transfer of power.

In some embodiments, MITUs or autonomous smart rack robots may behave not just as individual devices, but like a swarm of devices. For instance, the power device 640 of MITU 600 may be operationally configured to request power from or relay power to another MITU in its vicinity. In some examples, such power transfer may be achieved via power connectors, such as male/female connectors or magnetically attachable power connectors located on the MITUs. In some other cases, the MITU 600 may request to use a power supply/outlet when it is running low on power, for instance, when another autonomous storage unit is already using the said power supply and has reached a sufficient level of charge. In some cases, a swarm of MITUs may be configured to tightly pack themselves, which serves to not only reduce floor space, but also the number of charge points needed. In some circumstances, floor mounted recharge plates may be installed on warehouse floors to propagate power to a large number of tightly packed MITUs.

Figure 7:
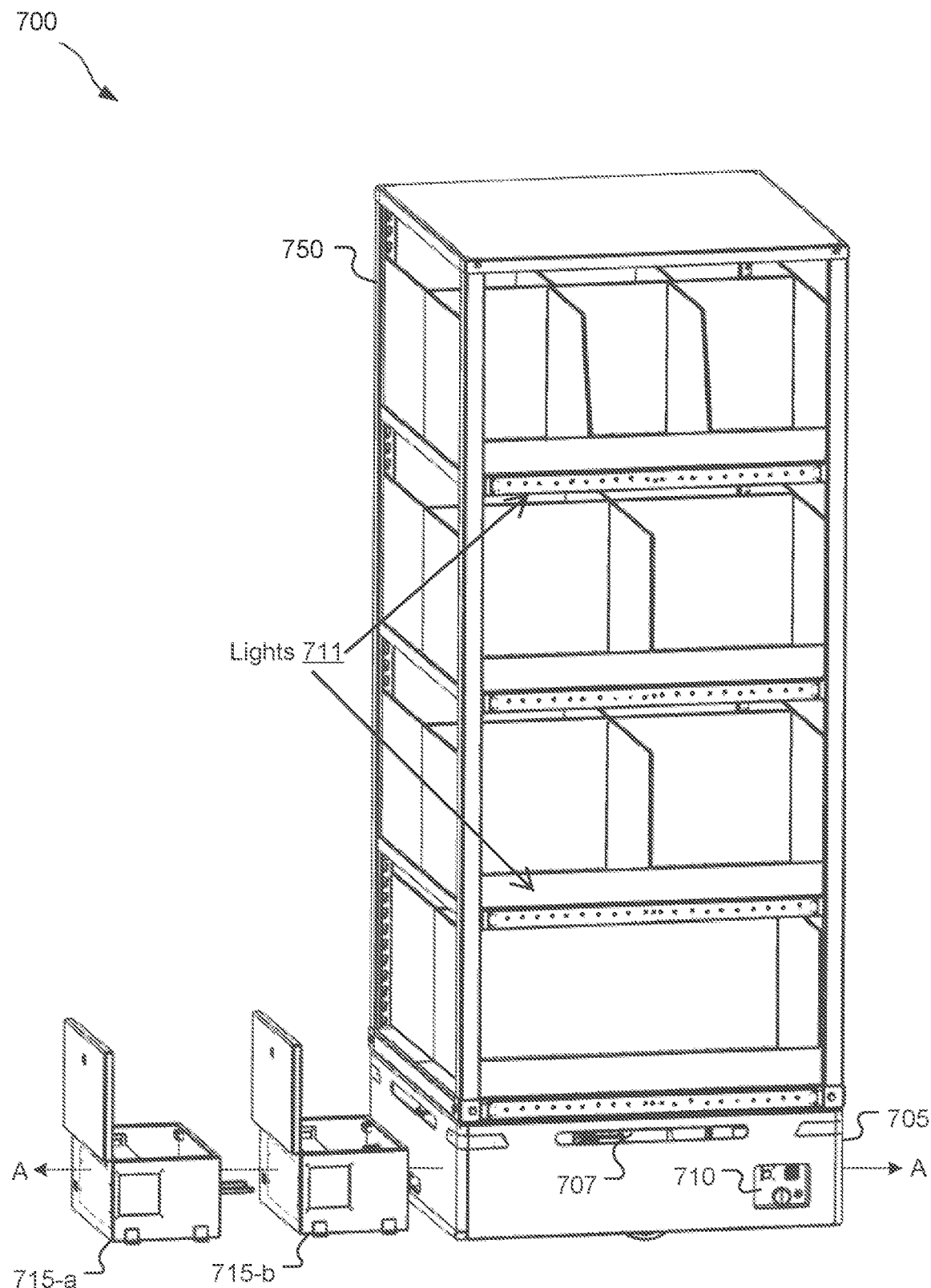
FIG. 7 is a side view of a MITU in accordance with an alternate embodiment of the disclosure.

FIG. 7 illustrates a side view of a MITU 700, in accordance with an alternate embodiment of the disclosure. In some cases, MITU 700 may be similar to or substantially similar to MITU 600, as described with reference to FIG. 6. Further, MITU 700 may include one or more of its subcomponents. For instance, MITU 700 may comprise a robot portion, including at least a drive device, a balance device, a control device, a navigation device, a sensing device, and a power device. Further, the MITU 700 may comprise a structural portion including at least housing 705 and inventory storage device 750. As shown, in some examples, the robot portion of the MITU 700 may be shaped like a cube, a cuboid, a cylinder, or any other shape, and may comprise one or more wheels and balance devices on its lower portion. In some other cases, the robot portion may be surrounded by, or substantially surrounded by the housing 705. Further, the robot portion may be in electronic communication (either wired or wireless) with the housing device 705 and/or the inventory storage device 750. In some cases, inventory storage device 750 may also comprise one or more lights 711.

In some examples, the housing 705 may comprise one or more slots 707 on one or more sides/faces behind which a sensing device may be placed. In some cases, housing 705 may also comprise one or more manual interfaces 710. Further, the manual interface 710 may be a manual power switch through which a user can turn the autonomous storage unit or MITU on/off. In some other cases, the manual interface 710 may comprise one or more connectors (i.e., metallic, conductive, or magnetic), which may be used to dock the MITU to an external charging station. In some examples, the MITU 700 may be configured to navigate autonomously to a charging station when its battery or power level falls below a threshold (e.g., 10%, 20%, etc.).

As shown, in some embodiments, the housing portion of MITU 700 may comprise one or more detachable climate-controlled units 715-*a*, 715-*b* that can slide in and out of the MITU. In some examples, these climate-controlled units 715 may be electrically connected to the power device and may be capable of both heating and cooling. In other cases, the inventory storage device 750 of MITU 700 may also be climate controlled. In such cases, the MITU 700 may be capable of transporting hot and cold items (e.g., food, beverages, medicines or vaccines, etc.).

In one example, upon loading the climate-controlled units 715, the MITU 700 may be specified a certain goal temperature (or temperature range) for those items. In some embodiments, climate-controlled units 715 may comprise one or more electronic temperature sensors (not shown) for real-time monitoring. In such cases, the climate-controlled units or the control device of the autonomous storage unit may adjust the internal temperature to stay within the specified range based in part on readings obtained from the electronic temperature sensors. In some embodiments, climate-controlled units 715-*a* and 715-*b* may be specified different goal temperatures (e.g., one unit may be used for cooling, and the other for heating). In such cases, the MITU or autonomous storage unit may leverage its inbuilt power and control functionality to maintain the units at their respective desired goal temperatures. In yet other cases, the MITU 700 may not be specified a goal temperature for items placed in the climate-controlled units 715, and may identify an appropriate temperature based on determining information pertaining to the one or more loaded items (e.g., via SKUs, RFID tags, barcodes, etc. of the items). In some cases, MITU 700 may be configured to communicate any deviations in temperature outside the specified range to a central system, such as central system 301 or central system 425, as described in relation to FIGS. 3 and 4, respectively. Upon receiving an alert from the autonomous storage unit or MITU 700, corrective actions may be implemented by one or more of the MITU 700 or the central system. For example, the MITU 700 may receive instructions from the central system to raise or reduce the specified temperature ranges based on the central system determining faulty temperature sensor readings. In other cases, the MITU 700 may be redirected to the closest storage facility or warehouse for a diagnosis check, optionally offload its inventory to a functioning autonomous storage unit, and/or evaluate the condition of its inventory. In this way, the corrective action may be implemented at the MITU 700 in a timely manner, which may also serve to minimize financial losses. In some embodiments, after offloading its inventory to the functioning autonomous storage unit, the MITU 700 may also provide it with instructions on completing the remainder of the mission.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of directing and controlling an autonomous inventory management system, the method comprising:
   placing an inventory item in an autonomous storage unit;
   directing the autonomous storage unit to depart a starting location;
   scheduling a first route for the autonomous storage unit to travel from the starting location to a first arrival location, wherein scheduling the first route is based at least in part on the autonomous storage unit communicating with a first transport system to plan the first route from the starting location to the first arrival location;
   directing the autonomous storage unit to board the first transport system departing for the first arrival location, wherein the first transport system departs the starting location at a first departure time, and is scheduled to arrive at the first arrival location at a first scheduled arrival time;
   identifying, by the autonomous storage unit, a delay while in route to the first arrival location, wherein identifying the delay is based at least in part on the first scheduled arrival time, a current time, and a geo-location of the autonomous storage unit, and wherein the autonomous storage unit is configured to self-monitor its geolocation;

determining, based at least in part on identifying the delay, an alternate route for the autonomous storage unit to continue travel to the first arrival location, wherein determining the alternate route is based at least in part on, the autonomous storage unit communicating with the first transport system to disembark the first transport system at a waypoint between the starting location and the first arrival location, and the autonomous storage unit communicating with a second transport system to schedule transport of the autonomous storage unit from the waypoint to the first arrival location;

and directing the autonomous storage unit to board the second transport system departing from the waypoint to the first arrival location.

2. The method of claim 1, further comprising:
determining, while at the first arrival location, a second arrival location for the autonomous storage unit;
directing the autonomous storage unit to move to a boarding position at the first arrival location; and
directing the autonomous storage unit to board a third transport system departing for a second arrival location.

3. The method of claim 1, wherein the autonomous storage unit is a shelf unit.

4. The method of claim 1, wherein the autonomous storage unit is a climate-controlled container.

5. The method of claim 1, wherein determining the alternate route for the autonomous storage unit is based on a set of priorities set by a central inventory control system.

6. The method of claim 1, further comprising:
reporting, by the autonomous storage unit, the geo location to a central inventory control system; and
receiving, by the autonomous storage unit, instructions from the central inventory control system.

7. The method of claim 1, further comprising:
the autonomous storage unit sending one or more messages back to an originating sender and informing the originating sender about a status of a delivery progress, wherein the one or more messages are sent wirelessly, and wherein a central system is assigned to the originating sender; and
the originating sender communicating new instructions to the autonomous storage unit based on the status of the delivery progress, wherein the new instructions are sent wirelessly to the autonomous storage unit.

8. The method of claim 1, wherein the autonomous storage unit is assigned a budget to transport the inventory item from the starting location to the first arrival location.

9. The method of claim 1, wherein the autonomous storage unit is configured to communicate with each of the first transport system and the second transport system using at least one of Wi-Fi, cellular communication, near field communication (NFC), and Bluetooth.

10. The method of claim 1, wherein each of the first transport system and the second transport system is configured to communicate with a central system using at least one of Wi-Fi, cellular communication, near field communication (NFC), and Bluetooth.

11. The method of claim 1, wherein:
the autonomous storage unit is configured to communicate with the first transport system and the second transport system using first wireless communication means; and
each of the first transport system and the second transport is configured to communicate with a central system using second wireless communication means, wherein the second wireless communication means are different from the first wireless communications means.

12. The method of claim 11, wherein:
the first wireless communication means comprise one of Wi-Fi, cellular communication, near field communication (NFC), and Bluetooth, and
the second wireless communication means comprise another one of Wi-Fi, cellular communication, NFC, and Bluetooth.

13. A non-transient computer-readable storage medium having instructions embodied thereon, the instructions being executable by one or more processors to perform a method for directing and controlling an autonomous inventory management system, the method comprising:
placing an inventory item in an autonomous storage unit;
directing the autonomous storage unit to depart a starting location;
scheduling a first route for the autonomous storage unit to travel from the starting location to a first arrival location, wherein scheduling the first route is based at least in part on the autonomous storage unit communicating with a first transport system to plan the first route from the starting location to the first arrival location;
directing the autonomous storage unit to board the first transport system departing for the first arrival location, wherein the first transport system departs the starting location at a first departure time, and is scheduled to arrive at the first arrival location at a first scheduled arrival time;
identifying, by the autonomous storage unit, a delay while in route to the first arrival location, wherein identifying the delay is based at least in part on the first scheduled arrival time, a current time, and a geo-location of the autonomous storage unit, and wherein the autonomous storage unit is configured to self-monitor its geolocation;
determining, based at least in part on identifying the delay, an alternate route for the autonomous storage unit to continue travel to the first arrival location, wherein determining the alternate route is based at least in part on,
the autonomous storage unit communicating with the first transport system to disembark the first transport system at a waypoint between the starting location and the first arrival location, and
the autonomous storage unit communicating with a second transport system to schedule transport of the autonomous storage unit from the waypoint to the first arrival location;
and
directing the autonomous storage unit to board the second transport system departing from the waypoint to the first arrival location.

* * * * *